US012081327B2

(12) United States Patent
Wang et al.

(10) Patent No.: US 12,081,327 B2
(45) Date of Patent: *Sep. 3, 2024

(54) USER EQUIPMENT SHIFT RANDOMIZATION FOR UPLINK CONTROL CHANNEL TRANSMISSION

(71) Applicant: QUALCOMM Incorporated, San Diego, CA (US)

(72) Inventors: Renqiu Wang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,262

(22) Filed: Jun. 13, 2023

(65) Prior Publication Data

US 2023/0327799 A1  Oct. 12, 2023

Related U.S. Application Data

(63) Continuation of application No. 17/715,609, filed on Apr. 7, 2022, now Pat. No. 11,728,923, which is a
(Continued)

(51) Int. Cl.
*H04L 1/00* (2006.01)
*H04B 7/06* (2006.01)
(Continued)

(52) U.S. Cl.
CPC ........... *H04L 1/001* (2013.01); *H04B 7/0617* (2013.01); *H04L 1/1607* (2013.01);
(Continued)

(58) Field of Classification Search
CPC ..... H04L 1/001; H04L 1/1607; H04L 1/1861; H04L 5/0055; H04B 7/0617;
(Continued)

(56) References Cited

U.S. PATENT DOCUMENTS 9,408,200 B2 * 8/2016 Kim ........................ H04L 5/001
9,781,718 B2 * 10/2017 Sorrentino .......... H04J 13/0062
(Continued)

FOREIGN PATENT DOCUMENTS

CN 103748821 A 4/2014
CN 103873220 A 6/2014
(Continued)

OTHER PUBLICATIONS

Taiwan Search Report—TW111138123—TIPO—Oct. 23, 2023.
(Continued)

*Primary Examiner* — Jael M Ulysse
(74) *Attorney, Agent, or Firm* — Holland & Hart LLP

(57) ABSTRACT

Methods, systems, and devices for wireless communications are described. In some cases, randomized shifts of a base sequence may be used for transmitting uplink control information. For example, a user equipment (UE) may identify a base sequence of an uplink control message. The UE may also receive signaling that indicates a UE-specific initial shift that may be applied to the base sequence. In some examples, the signaling that indicates the randomized shift may be explicit, implicit, or a combination thereof. After determining one or more shifted sequences based on the UE-specific initial shift, a payload of the uplink control message, and the base sequence, the UE may select a shifted sequence to be transmitted, where the selection is based on a payload of the uplink control message. For example, different shifted sequences may be selected for respective transmissions of scheduling requests, 1-bit acknowledgments (ACKs), 2-bit ACKs, and the like.

27 Claims, 13 Drawing Sheets

Related U.S. Application Data continuation of application No. 16/202,927, filed on Nov. 28, 2018, now Pat. No. 11,303,384.

(60) Provisional application No. 62/592,391, filed on Nov. 29, 2017.

(51) Int. Cl.
| | |
|---|---|
| *H04L 1/1607* | (2023.01) |
| *H04L 1/1829* | (2023.01) |
| *H04L 5/00* | (2006.01) |
| *H04W 72/0453* | (2023.01) |
| *H04W 72/21* | (2023.01) |
| *H04W 72/23* | (2023.01) |
| *H04B 7/0413* | (2017.01) |

(52) U.S. Cl.
CPC .......... *H04L 1/1861* (2013.01); *H04L 5/0055* (2013.01); *H04W 72/0453* (2013.01); *H04W 72/21* (2023.01); *H04W 72/23* (2023.01); *H04B 7/0413* (2013.01)

(58) Field of Classification Search
CPC .... H04B 7/0413; H04W 72/21; H04W 72/23; H04W 72/0453
See application file for complete search history.

(56) References Cited

U.S. PATENT DOCUMENTS

| | | | | |
|---|---|---|---|---|
| 11,303,384 | B2* | 4/2022 | Wang | H04B 7/0617 |
| 2008/0311942 | A1* | 12/2008 | Kim | H04L 5/0005 |
| | | | | 455/509 |
| 2009/0245194 | A1* | 10/2009 | Damnjanovic | H04L 1/1812 |
| | | | | 370/329 |
| 2011/0019529 | A1* | 1/2011 | Wang | H04L 1/1692 |
| | | | | 370/252 |
| 2011/0081932 | A1* | 4/2011 | Astely | H04W 28/26 |
| | | | | 455/509 |
| 2011/0188447 | A1* | 8/2011 | Wang | H04W 72/23 |
| | | | | 370/328 |
| 2011/0242997 | A1* | 10/2011 | Yin | H04W 72/02 |
| | | | | 370/252 |
| 2011/0243066 | A1* | 10/2011 | Nayeb Nazar | H04L 5/0016 |
| | | | | 370/328 |
| 2012/0076023 | A1* | 3/2012 | Ko | H04L 5/006 |
| | | | | 370/252 |
| 2012/0082145 | A1* | 4/2012 | Chen | H04L 1/1861 |
| | | | | 370/338 |
| 2012/0082263 | A1* | 4/2012 | Ebrahimi Tazeh Mahalleh | H04L 1/1861 |
| | | | | 375/299 |
| 2012/0113831 | A1* | 5/2012 | Pelletier | H04L 5/0053 |
| | | | | 370/252 |
| 2012/0294272 | A1* | 11/2012 | Han | H04W 72/21 |
| | | | | 370/329 |
| 2012/0320805 | A1* | 12/2012 | Yang | H04L 5/0053 |
| | | | | 370/280 |
| 2012/0327880 | A1* | 12/2012 | Ahn | H04L 5/0055 |
| | | | | 370/329 |
| 2013/0016604 | A1* | 1/2013 | Ko | H04L 1/1861 |
| | | | | 370/216 |
| 2013/0028225 | A1 | 1/2013 | Ko et al. | |
| 2013/0163406 | A1* | 6/2013 | Oizumi | H04W 28/04 |
| | | | | 370/242 |
| 2013/0182676 | A1* | 7/2013 | Lee | H04L 1/0029 |
| | | | | 370/329 |
| 2013/0195025 | A1* | 8/2013 | Chatterjee | H04W 72/20 |
| | | | | 370/329 |
| 2013/0258914 | A1* | 10/2013 | Seo | H04J 3/1694 |
| | | | | 370/280 |
| 2013/0258978 | A1* | 10/2013 | Aiba | H04L 1/1812 |
| | | | | 370/329 |
| 2014/0133373 | A1* | 5/2014 | Han | H04L 5/0055 |
| | | | | 370/329 |
| 2014/0219202 | A1 | 8/2014 | Kim et al. | |
| 2014/0226583 | A1* | 8/2014 | Oizumi | H04W 52/04 |
| | | | | 370/329 |
| 2014/0314026 | A1* | 10/2014 | Ko | H04W 28/04 |
| | | | | 370/329 |
| 2015/0036607 | A1* | 2/2015 | Park | H04L 27/2613 |
| | | | | 370/329 |
| 2016/0226639 | A1 | 8/2016 | Xiong et al. | |
| 2016/0226645 | A1* | 8/2016 | Kim | H04W 72/21 |
| 2017/0041923 | A1* | 2/2017 | Park | H04W 76/27 |
| 2017/0086219 | A1* | 3/2017 | Lee | H04W 72/12 |
| 2017/0188352 | A1* | 6/2017 | Lee | H04L 1/1812 |
| 2017/0223695 | A1* | 8/2017 | Kwak | H04L 5/0051 |
| 2017/0245262 | A1* | 8/2017 | Nayeb Nazar | H04W 72/0446 |
| 2017/0302412 | A1* | 10/2017 | Guan | H04L 5/0053 |
| 2018/0167932 | A1* | 6/2018 | Papasakellariou | H04L 1/1671 |
| 2018/0310257 | A1* | 10/2018 | Papasakellariou | H04W 52/367 |
| 2019/0074935 | A1* | 3/2019 | Babaei | H04W 72/02 |
| 2019/0165879 | A1 | 5/2019 | Wang et al. | |
| 2020/0295878 | A1* | 9/2020 | Choi | H04W 28/04 |
| 2022/0303042 | A1 | 9/2022 | Wang et al. | |

FOREIGN PATENT DOCUMENTS

| | | |
|---|---|---|
| JP | 2018533877 A | 11/2018 |
| KR | 20140057335 A | 5/2014 |
| WO | 2011096720 A2 | 8/2011 |
| WO | 2013168341 A1 | 11/2013 |
| WO | 2017034096 A1 | 3/2017 |
| WO | 2017073465 A1 | 5/2017 |
| WO | 2019031954 A1 | 2/2019 |
| WO | 2021194123 A1 | 9/2021 |

OTHER PUBLICATIONS

European Search Report—EP23200450—Search Authority—The Hague—Dec. 12, 2023.
CATT: "On Short PUCCH Design for up to Two UCI Bits", 3GPP TSG RAN WG1 #90bis, R1-1717826, Prague, CZ, Oct. 9-13, 2017, 5 Pages.
Ericsson: "On the Design of 1-Symbol PUCCH for up to 2 bits", 3GPP Draft; R1-1720999, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 27, 2017-Dec. 1, 2017 Nov. 18, 2017, XP051370362, Retrieved from the Internet: URL: http://www.3gpp.org/ftp/tsg%5Fran/WG1%5FRL1/TSGR1%5F91/Docs/ [retrieved on Nov. 18, 2017], 8 pages.
Huawei, et al., "Short PUCCH for UCI of up to 2 Bits", 3GPP TSG RAN WG1 Meeting #90, R1-1712190, 3GPP, Mobile Competence Centre, 650, Route Des Lucioles, F-06921 Sophia-Antipolis Cedex, France, vol. Ran WG1, No. Prague, Czech Republic, Aug. 21, 2017-Aug. 25, 2017, Aug. 20, 2017, 4 Pages, XP051315007, 20170812, Retrieved from the Internet: URL: http://www.3gpp.org/ftp/Meetings_3GPP_SYNC/RAN1/Docs/.
Intel Corporation: "Short PUCCH for UCI up to 2 Bits", 3GPP TSG RAN WG1 Meeting 91, R1-1720085, Reno, USA, Nov. 27-Dec. 1, 2017, pp. 1-5.
Intel Corporation: "sPUCCH Resource Allocation for sTTI", 3GPP TSG-RAN WG1 #90, R1-1712473 Prague, Czechia Aug. 21-25, 2017, pp. 1-2.
Interdigital Inc: "On HARQ-ACK and SR Multiplexing on Short-PUCCH", 3GPP Draft, 3GPP TSG RAN WG1 Meeting 91, R1-1720638, On HARQ-ACK and SR Multiplexing on Short-PUCCH, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051370102, 8 pages.
International Preliminary Report on Patentability—PCT/US2018/062979, The International Bureau of WIPO—Geneva, Switzerland, Jun. 11, 2020.
International Search Report and Written Opinion—PCT/US2018/062979—ISA/EPO—Feb. 21, 2019.

(56) References Cited

OTHER PUBLICATIONS

NEC: "Resource Allocation for NR PUCCH", 3GPP TSG RAN WG1 Meeting 91, R1-1720380 PUCCH_RESOURCE_ALLOCATION_V3E, 3rd Generation Partnership Project, Mobile Competence Centre, 650, Route Des Lucioles, F-06921 Sophia-Antipolis Cedex, France, vol. Ran WG1, No. Reno, Nevada, Nov. 27, 2017-Dec. 1, 2017, 8 Pages, Nov. 18, 2017, XP051369943.

NTT Docomo, et al., "New Radio (NR) Access Technology", 3GPP TSG RAN Meeting #77, RP-171783, SR on NR-WID, Status Report to TSG, 3rd Generation Partnership Project, Mobile Competence Centre, 650, Route Des Lucioles, F-06921 Sophia-Antipolis Cedex, France, vol. TSG RAN, No. Sapporo, Japan, Sep. 11, 2017-Sep. 14, 2017, Sep. 6, 2017, XP051668625, 284 Pages.

OPPO: "Short-PUCCH for UCI of up to 2 bits", 3GPP Draft; R1-1719991, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 27, 2017-Dec. 1, 2017 Nov. 18, 2017, XP051369687, Retrieved from the Internet: URL: http://www.3gpp.org/ftp/tsg%5Fran/WG1%5FRL1/TSGR1%5F91/Docs/ [retrieved on Nov. 18, 2017], 3 pages.

Qualcomm Incorporated: "Channelization of 1-Symbol Short PUCCH with 1 or 2 Bits Payload", 3GPP Draft; R1-1720679 Channelization of 1-Symbol Short PUCCH with 1 or 2 Bits Payload, 3rd Generation Partnership Project (3GPP), Mobile Competence Centre, 650, Route Des Lucioles, F-06921 Sophia-Antipolis Cedex, France, vol. Ran WG1, No. Reno, US; Nov. 27, 2017-Dec. 1, 2017 Nov. 18, 2017, XP051370140, 7 pages.

Qualcomm Incorporated: "Remaining Issues for Resource Allocation for PUCCH", 3GPP TSG RAN WG1 Meeting AH 1801, R1-1800874, 3rd Generation Partnership Project, Mobile Competence Centre, 650, Route Des Lucioles, F-06921 Sophia-Antipolis Cedex, vol. RAN WG1, No. Vancouver, Canada, Jan. 22, 2018-Jan. 26, 2018, Jan. 13, 2018, XP051385144, 9 Pages, Section 2, p. 5, Section 3, p. 6, Section 4, p. 7, Section 5, p. 7-p. 9.

Taiwan Search Report—TW107142651—TIPO—Dec. 15, 2021.
Taiwan Search Report—TW107142651—TIPO—Jul. 12, 2022.

* cited by examiner

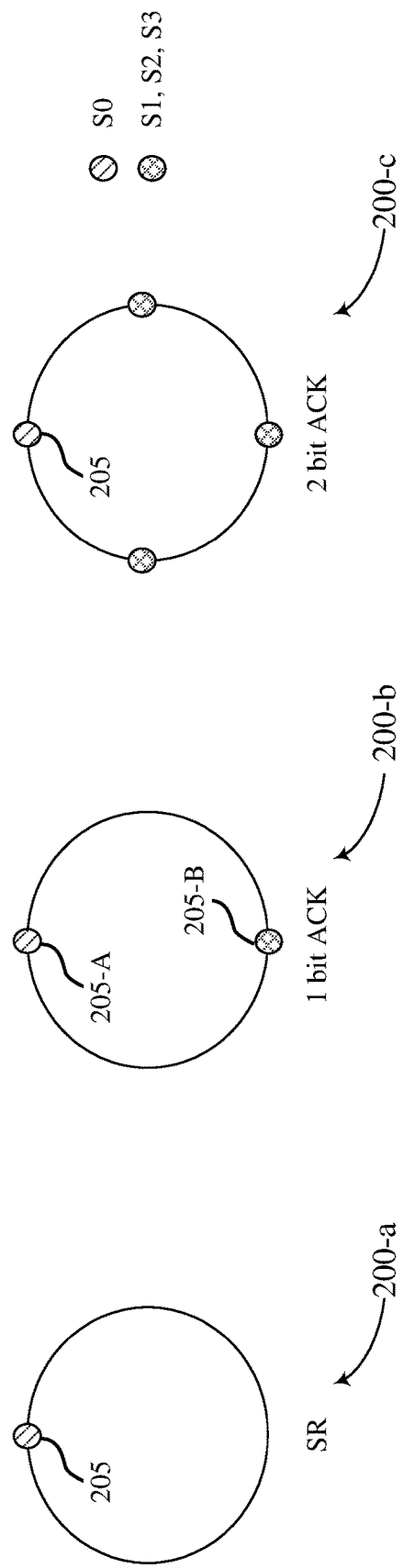
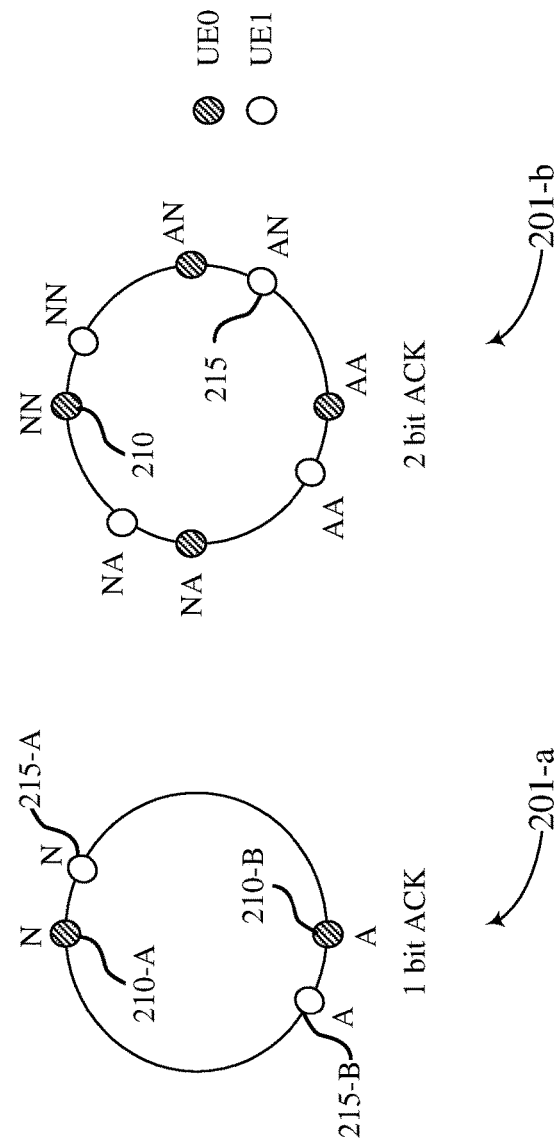
FIG. 2A
FIG. 2B

USER EQUIPMENT SHIFT RANDOMIZATION FOR UPLINK CONTROL CHANNEL TRANSMISSION

CROSS REFERENCES

The present Application for Patent is a Continuation of U.S. patent application Ser. No. 17/715,609 by Wang et al., entitled "USER EQUIPMENT SHIFT RANDOMIZATION FOR UPLINK CONTROL CHANNEL TRANSMISSION" filed Apr. 7, 2022, which is a Continuation of U.S. patent application Ser. No. 16/202,927 by Wang et al., entitled "USER EQUIPMENT SHIFT RANDOMIZATION FOR UPLINK CONTROL CHANNEL TRANSMISSION" filed Nov. 28, 2018, which claims benefit of U.S. Provisional Patent Application No. 62/592,391 by Wang et al., entitled "USER EQUIPMENT SHIFT RANDOMIZATION FOR UPLINK CONTROL CHANNEL FORMAT 0 IN NEW RADIO," filed Nov. 29, 2017, all of which are assigned to the assignee hereof, and expressly incorporated by reference herein.

BACKGROUND

The following relates generally to wireless communication, and more specifically to user equipment shift randomization for uplink control channel format transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

UEs in a wireless system may transmit uplink control information to a base station (e.g., for scheduling requests, hybrid automatic repeat request (HARM) feedback, or the like), where each UE may utilize a physical uplink control channel (PUCCH) for the transmission. However, when multiple UEs are multiplexed on resources within a cell, the uplink control information transmissions by different UEs may cause inter-cell interference.

SUMMARY

The described techniques relate to improved methods, systems, devices, or apparatuses that support user equipment (UE) shift randomization for uplink control channel transmission. Generally, the described techniques provide for the use of shifts of a base sequence used for transmitting uplink control information. For example, a UE may identify a base sequence that is used for the transmission of an uplink control message. The UE may also receive signaling that indicates a UE-specific initial shift that may be used with (e.g., applied to) the identified base sequence. In some cases, the signaling may be explicit (e.g., using a number of bits in a received control message) or may be implicit based on a mapping of a control channel element (CCE) index. In other examples, there may be a combination of explicit and implicit mapping used for the indication of the initial shift. In some examples, the UE may determine uplink control information and determine a shifted sequence of the base sequence based on the UE-specific initial shift and the uplink control information. For example, different shifted sequences may be used for transmissions of scheduling requests, 1-bit acknowledgments (ACKs), 2-bit ACKs, and the like. The UE may transmit the uplink control information in the uplink control message based on the shifted sequence. A base station may receive the shifted sequence from the UE (e.g., the uplink control information in the uplink control message) and may also receive different shifted sequences from other UEs. Due to the shifts of the base sequence, the same UEs are likely to not interfere with each other; while interference between multiple UEs may still be possible, the randomized shifts result in the avoidance of interference between UEs that would normally interfere with each other's uplink transmissions if the shifts were not randomized (but were always the same).

A method of wireless communication is described. The method may include identifying a base sequence for transmission of an uplink control message, receiving signaling that indicates a UE-specific initial shift to be used with the base sequence, determining uplink control information for the uplink control message, determining a shifted sequence of the base sequence based on the UE-specific initial shift and the uplink control information, and transmitting the uplink control information in the uplink control message, where the uplink control information is based on the shifted sequence.

An apparatus for wireless communication is described. The apparatus may include a processor, memory in electronic communication with the processor, and instructions stored in the memory. The instructions may be executable by the processor to cause the apparatus to identify a base sequence for transmission of an uplink control message, receive signaling that indicates a UE-specific initial shift to be used with the base sequence, determine uplink control information for the uplink control message, determine a shifted sequence of the base sequence based on the UE-specific initial shift and the uplink control information, and transmit the uplink control information in the uplink control message, where the uplink control information is based on the shifted sequence.

Another apparatus for wireless communication is described. The apparatus may include means for identifying a base sequence for transmission of an uplink control message, receiving signaling that indicates a UE-specific initial shift to be used with the base sequence, determining uplink control information for the uplink control message, determining a shifted sequence of the base sequence based on the UE-specific initial shift and the uplink control information, and transmitting the uplink control information in the uplink control message, where the uplink control information is based on the shifted sequence.

A non-transitory computer-readable medium storing code for wireless communication is described. The code may include instructions executable by a processor to identify a base sequence for transmission of an uplink control message, receive signaling that indicates a UE-specific initial shift to be used with the base sequence, determine uplink control information for the uplink control message, determine a shifted sequence of the base sequence based on the UE-specific initial shift and the uplink control information, and transmit the uplink control information in the uplink control message, where the uplink control information is based on the shifted sequence.

Some examples of the method, apparatuses, and non-transitory computer-readable medium described herein may further include operations, features, means, or instructions for identifying that a payload of the uplink control information may be one of a scheduling request (SR), a one-bit acknowledgement, or a two-bit acknowledgement, and determining the shifted sequence based on the identified payload.

In some examples of the method, apparatuses, and non-transitory computer-readable medium described herein, the uplink control message may be formatted as a short physical uplink control channel message, and where the payload of the uplink control information includes the one-bit acknowledgment or the two-bit acknowledgment.

In some examples of the method, apparatuses, and non-transitory computer-readable medium described herein, the payload of the uplink control information may include operations, features, means, or instructions for determining the shifted sequence based on a shift value that corresponds to the payload the uplink control information, the shift value including a value of 0 or 6.

In some examples of the method, apparatuses, and non-transitory computer-readable medium described herein, the uplink control information may include operations, features, means, or instructions for determining the shifted sequence based on a shift value that corresponds to the payload the uplink control information, the shift value including a value of 0, 3, 6, or 9.

In some examples of the method, apparatuses, and non-transitory computer-readable medium described herein, determining the uplink control information may include operations, features, means, or instructions for determining a size of acknowledgment information in the uplink control information.

In some examples of the method, apparatuses, and non-transitory computer-readable medium described herein, receiving the signaling that indicates the UE-specific initial shift may include operations, features, means, or instructions for receiving an explicit indication of the UE-specific initial shift.

In some examples of the method, apparatuses, and non-transitory computer-readable medium described herein, the explicit indication may be included within ACK resource indicator (ARI) bits of a DCI message.

In some examples of the method, apparatuses, and non-transitory computer-readable medium described herein, a number of the ARI bits may be sufficiently large such that two raised to the number of the ARI bits may be greater than a number of resources configured for the uplink control message.

In some examples of the method, apparatuses, and non-transitory computer-readable medium described herein, receiving the signaling that indicates the UE-specific initial shift may include operations, features, means, or instructions for receiving a downlink grant control message having a CCE index from which the UE-specific initial shift may be derived.

Some examples of the method, apparatuses, and non-transitory computer-readable medium described herein may further include operations, features, means, or instructions for deriving an RB index and a shift index for the UE-specific initial shift based on the CCE index of the downlink grant control message.

In some examples of the method, apparatuses, and non-transitory computer-readable medium described herein, receiving the signaling that indicates the UE-specific initial shift may include operations, features, means, or instructions for receiving an explicit indication of a subset of resources configured for the uplink control message, receiving a downlink grant control message having a CCE index, and deriving a RB index and a shift index for the UE-specific initial shift based on the CCE index as applied to the subset of resources.

In some examples of the method, apparatuses, and non-transitory computer-readable medium described herein, the explicit indication may be included within ARI bits of a DCI message.

In some examples of the method, apparatuses, and non-transitory computer-readable medium described herein, a number of the ARI bits may be such that two raised to the number of the ARI bits may be less than a number of resources configured for the uplink control message.

Some examples of the method, apparatuses, and non-transitory computer-readable medium described herein may further include operations, features, means, or instructions for determining one or more shifted sequences based on the UE-specific initial shift and the uplink control information, and selecting the shifted sequence from the one or more shifted sequences based on a payload of the uplink control message.

Some examples of the method, apparatuses, and non-transitory computer-readable medium described herein may further include operations, features, means, or instructions for randomizing the selecting of the shifted sequence from the one or more shifted sequences.

A method of wireless communication is described. The method may include transmitting, to a UE, signaling that indicates a UE-specific initial shift to be applied to a base sequence for transmission of an uplink control message and receiving uplink control information in the uplink control message, where the uplink control information is based on a shifted sequence that is shifted with respect to the base sequence in accordance with the UE-specific initial shift and a payload of the uplink control information.

An apparatus for wireless communication is described. The apparatus may include a processor, memory in electronic communication with the processor, and instructions stored in the memory. The instructions may be executable by the processor to cause the apparatus to transmit, to a UE, signaling that indicates a UE-specific initial shift to be applied to a base sequence for transmission of an uplink control message and receive uplink control information in the uplink control message, where the uplink control information is based on a shifted sequence that is shifted with respect to the base sequence in accordance with the UE-specific initial shift and a payload of the uplink control information.

Another apparatus for wireless communication is described. The apparatus may include means for transmitting, to a UE, signaling that indicates a UE-specific initial shift to be applied to a base sequence for transmission of an uplink control message and receiving uplink control information in the uplink control message, where the uplink control information is based on a shifted sequence that is shifted with respect to the base sequence in accordance with the UE-specific initial shift and a payload of the uplink control information.

A non-transitory computer-readable medium storing code for wireless communication is described. The code may include instructions executable by a processor to transmit, to a UE, signaling that indicates a UE-specific initial shift to be applied to a base sequence for transmission of an uplink control message and receive uplink control information in the uplink control message, where the uplink control information is based on a shifted sequence that is shifted with respect to the base sequence in accordance with the UE-specific initial shift and a payload of the uplink control information.

In some examples of the method, apparatuses, and non-transitory computer-readable medium described herein, the uplink control message may be formatted as a short physical uplink control channel message, and where the payload of the uplink control information includes a one-bit acknowledgment or a two-bit acknowledgment.

In some examples of the method, apparatuses, and non-transitory computer-readable medium described herein, transmitting the signaling that indicates the UE-specific initial shift may include operations, features, means, or instructions for transmitting an explicit indication of the UE-specific initial shift.

In some examples of the method, apparatuses, and non-transitory computer-readable medium described herein, the explicit indication may be included within ARI bits of a DCI message.

In some examples of the method, apparatuses, and non-transitory computer-readable medium described herein, a number of the ARI bits may be sufficiently large such that two raised to the number of the ARI bits may be greater than a number of resources configured for the uplink control message.

Some examples of the method, apparatuses, and non-transitory computer-readable medium described herein may further include operations, features, means, or instructions for transmitting additional signaling to different UEs, the additional signaling indicating different UE-specific initial shifts to be applied to the base sequence by each of the different UEs such that interference between transmissions of uplink control messages may be randomized.

In some examples of the method, apparatuses, and non-transitory computer-readable medium described herein, transmitting the signaling that indicates the UE-specific initial shift may include operations, features, means, or instructions for transmitting a downlink grant control message having a CCE index from which the UE-specific initial shift may be derived.

In some examples of the method, apparatuses, and non-transitory computer-readable medium described herein, transmitting the signaling that indicates the UE-specific initial shift may include operations, features, means, or instructions for transmitting an explicit indication of a subset of resources configured for the uplink control message, and transmitting a downlink grant control message having a CCE index such that a RB index and shift index for the UE-specific initial shift may be able to be derived based on the CCE index as applied to the subset of resources.

In some examples of the method, apparatuses, and non-transitory computer-readable medium described herein, the explicit indication may be included within ARI bits of a DCI message.

In some examples of the method, apparatuses, and non-transitory computer-readable medium described herein, a number of the ARI bits may be such that two raised to the number of the ARI bits may be less than a number of resources configured for the uplink control message.

BRIEF DESCRIPTION OF THE DRAWINGS

FIGS. 2A and 2B illustrate examples of hypotheses and UE-specific shifts in a system that supports UE shift randomization for uplink control channel transmission in accordance with aspects of the present disclosure.

DETAILED DESCRIPTION

User equipment (UEs) in a wireless system may transmit uplink control information to a base station. For example, a UE may transmit a scheduling request (SR), or feedback information (e.g., hybrid automatic repeat request (HARQ feedback) using uplink control information transmitted on a physical uplink control channel (PUCCH). However, in some cases, when multiple UEs are multiplexed on the same resources (where a resource may be uniquely identified with a different symbol index, different resource block (RB) index, and a different shift index) within a cell, the uplink control information transmissions by different UEs may cause intra-cell interference. For instance, there may be intra-cell interference among multiple UEs for PUCCH transmissions using Format 0 (which may have only one or two uplink control information (UCI) bits), such as when the UEs from the same cell are multiplexed in the same RB.

As described herein, techniques may be utilized to randomize sequences used for uplink control information such that intra-cell interference is mitigated between different UEs. For example, there may a randomization of the shifts used for the transmission of sequence-based uplink control messages, which may also randomize the interference using low-complexity techniques. In some cases, the shifts for sequence-based control messages may be UE-specific, and may be indicated according to various techniques. For instance, an initial shift may be explicitly indicated, or implicitly mapped, or a combination thereof. In some examples, there may be an explicit indication of a shift using a certain number of bits in a downlink control message. In such cases, acknowledgment/negative acknowledgment (ACK/NACK) resource indicator (ARI) bits may be used for the explicit indication of the random initial shift. Additionally or alternatively, there may be an implicit mapping based on a CCE index of a downlink grant control message (e.g., received by the UE on a physical downlink control channel (PDCCH)). In other examples, the indication may be provided via radio resource control (RRC) signaling. Additionally or alternatively, there may be a combination of explicit and implicit mapping, where a subset of resources may be explicitly indicated, and a particular resource within the subsets may be implicitly mapped (e.g., to the CCE index), and a shifted sequence may be determined from the particular resource (e.g., based at least in part on a symbol index).

Aspects of the disclosure are initially described in the context of a wireless communications system. Aspects of the disclosure are further illustrated by and described with reference to apparatus diagrams, system diagrams, and flowcharts that relate to UE shift randomization for uplink control channel transmission.

Figure 1:
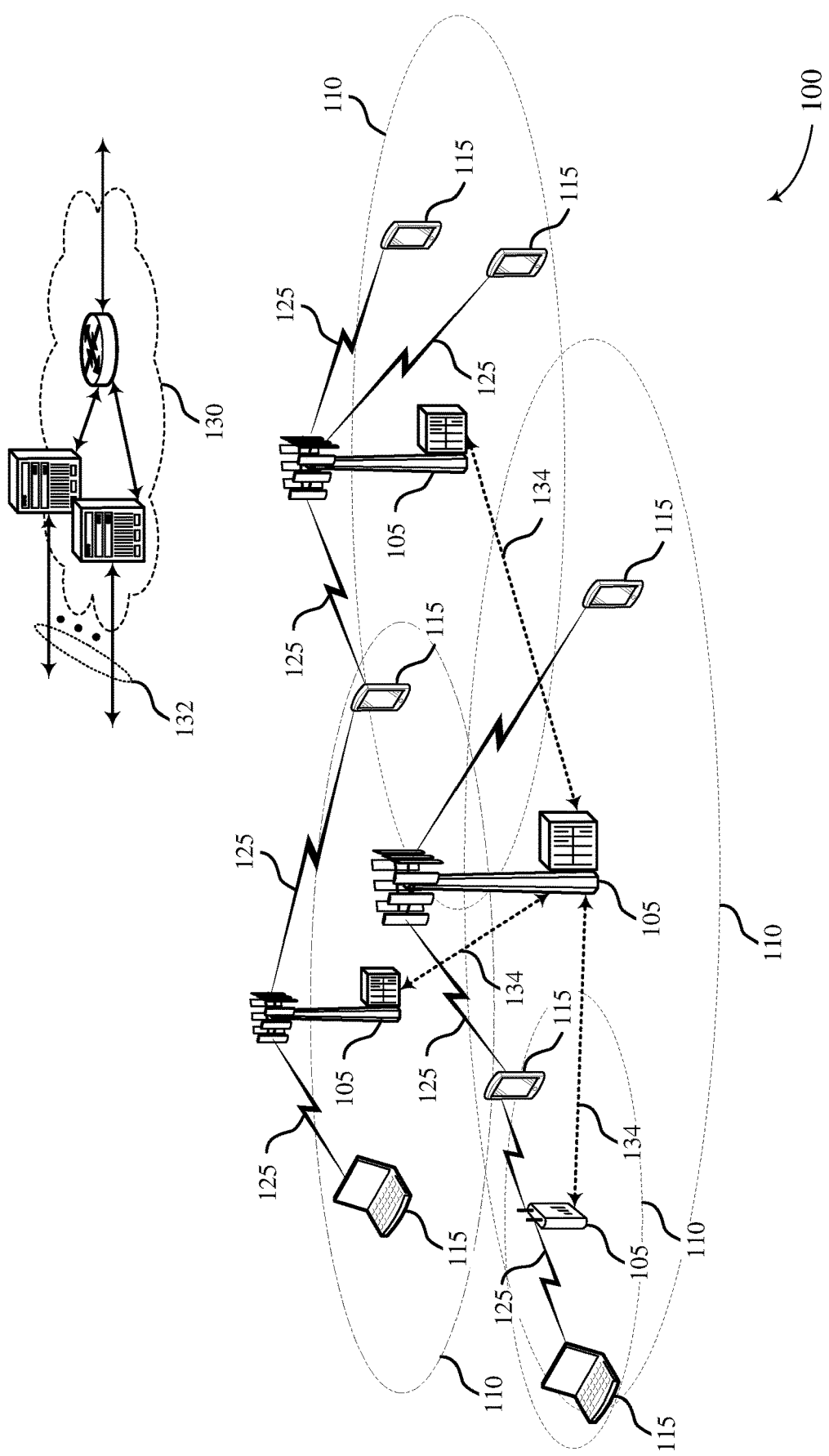
FIG. 1 illustrates an example of a system for wireless communication that supports user equipment (UE) shift randomization for uplink control channel transmission in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID), etc.) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The network operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 µs). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

PUCCH may be mapped to a control channel defined by a code and two consecutive resource blocks. Uplink control signaling may depend on the presence of timing synchronization for a cell. PUCCH resources for scheduling request (SR) and channel quality indicator (CQI) reporting may be assigned (and revoked) through RRC signaling. In some cases, resources for SR may be assigned after acquiring synchronization through a random access procedure (e.g., using a random access channel (RACH)). In other cases, an SR may not be assigned to a UE 115 through the RACH (i.e., synchronized UEs may or may not have a dedicated SR channel). PUCCH resources for SR and CQI may be lost when the UE 115 is no longer synchronized.

Wireless communications system 100 may support the use of randomized shifts of a base sequence used for transmitting uplink control information, which may lead to reduced interference between different UEs 115. For example, a UE 115 may identify a base sequence that is used for the transmission of an uplink control message. The UE 115 may also receive signaling that is indicative of a UE-specific initial shift that may be applied to the identified base sequence. In some cases, the signaling may be explicit (e.g., using a number of bits in a received control message) or may be implicit based on a mapping of a CCE index. In other examples, there may be a combination of explicit and implicit mapping used for the indication of the randomized initial shift. After determining one or more shifted sequences based on the UE-specific initial shift and the base sequence, the UE 115 may select a shifted sequence based on a payload of the uplink control message. For example, different shifted sequences may be used for respective transmissions of scheduling requests, 1-bit ACKs, 2-bit ACKs, and the like. The UE 115 may transmit the uplink control message based on the selected shifted sequence to a base station 105, and different UEs 115 may likewise use different initial shifts for their own respective transmissions to the base station 105.

FIGS. 2A and 2B illustrate examples of hypotheses 200 and UE-specific shifts 201, respectively, in a system that support UE shift randomization for uplink control channel transmission in accordance with various aspects of the present disclosure. In some examples, hypotheses 200 and UE-specific shifts 201 may be implemented in accordance with aspects of wireless communications system 100. For example, a UE 115 may transmit uplink control messages using a randomized initial shift of the sequence that makes up the control information. Such techniques may be used to randomize interference between UEs 115 that share the same resources (e.g., are multiplexed on the same RB).

In some examples, uplink control information may utilize a sequence-based design (e.g., uplink control information may be signaled as a particular sequence), and different formats of a PUCCH may be used for different purposes. For example, PUCCH Format 0 may be associated with a short PUCCH (sPUCCH) transmission, which may include uplink control information with a certain number of bits (e.g., 1 or 2 bits). In such cases, using a base sequence (e.g., having a length of 12), a UE 115 may be assigned an initial shift, and the UE 115 may then derive other shifts based on the initial shift. In some examples, and as described below, the derivation of the other shifts may be based on the uplink control information (e.g., 1-bit ACK, 2-bit ACK, SR), and shifting the base sequence may thus be based on the initial shift and the other shifts that are derived from the uplink control information. As an example, a base sequence with a length of 12 may be transmitted in a single resource bandwidth, and using cyclic shifts (e.g., in the time domain), there may different shifts of the base sequence that may be derived.

A UE 115 may be assigned an initial shift. The UE 115 may determine the initial shift based on a UE-specific hopping pattern (e.g., S0') and a cell-specific hopping pattern. In some examples, a UE 115 may determine a first shift S0 using the equation S0=(S0'+Scell)mod 12. In some cases, Scell may be predefined and may be a function of a cell ID and S0' may be provided to the UE 115 by the base station 105.

As illustrated in FIG. 2A, different hypothesis may be used with different shifts 205. For instance, for a first hypothesis 200-a used for the transmission of an SR, there may be twelve possible locations for a shift 205. Accordingly, a transmission of an SR (which may comprise only a single bit) by a UE 115 may include only one shift 205 (e.g., only S0).

In another example, such as hypothesis 200-b for a transmission of a 1-bit ACK, there may be a total of two shifts with a certain shift distance between shifts 205. As illustrated in the clock representation of hypothesis 200-b, a location of a shift 205 within a hypothesis 200 may correspond to a value of the shift 205, and a shift distance may correspond to a difference between respective shift values. As an illustrative example, a first shift 205-a may correspond to a shift value of 0 and a second shift 205-b may correspond to a shift value of 6. In some examples, the two shifts may be based on a value of the ACK bit (e.g., 1 or 0), where each value of the ACK bit may correspond to a different shift. In some cases, there may be twelve possible locations for the first shift 205-a, and the second shift 205-b may be separated by a distance of six shifts 205. For example, when a shift distance equals six, there may be a first shift, S0 (corresponding to shift 205-a), and a second shift, S1 (corresponding to shift 205-b), which may be calculated using the equation S1=(S0+6)mod 12).

In yet another example, in a third hypothesis 200-c for a 2-bit ACK, there may be a total of four shifts with a certain shift distance between each shift, where different shifts may correspond to different values in the clock representation of hypothesis 200-c. For instance, for a shift distance of three shifts, the UE 115 may use a first shift S0 (e.g., having a value of 0), a second shift, S1, calculated using S1=(S0+3) mod 12 (e.g., having a value of 3), a third shift, S2, calculated using (S0+6)mod 12 (e.g., having a value of 6), or a fourth shift, S3, calculated using S3=(S0+9)mod 12

(e.g., having a value of 9. In some examples, the four shifts may each be associated with a different value of the 2-bit ACK (e.g., {0,0}, {0,1}, {1,0}, and {1,1}). In other words, each 2-bit ACK value pair may correspond to a different shift. For instance, a 2-bit ACK having a value of {0, 0} may correspond to the first shift, while a 2-bit ACK having a value of {1,1} may correspond to the fourth shift.

As illustrated in FIG. 2B, different UEs 115 may be separated using different shifts. For example, there may be a total of 12 shifts per cell RB. Accordingly, for SR transmissions, there may be up to 12 UEs 115 multiplexed per RB, each UE 115 with one shift. For 1-bit ACK transmissions, for example, there may be up to 6 UEs 115 multiplexed per RB, each UE 115 with 2 shifts. For instance, as shown in UE-specific shift 201-*a*, a first UE 115 may use a first shift 210-*a* for NACK transmissions and also use a second shift 210-*b* for ACK transmissions. Likewise, a second UE 115 may use a first shift 215-*a* for NACK transmissions and also use a second shift 215-*b* for ACK transmissions. Additionally or alternatively, and as shown in UE-specific shifts 201-*b*, for 2-bit ACK transmissions, there may be up to 3 UEs 115 multiplexed per RB, each UE 115 with 4 shifts 210, 215. In any event, there may be a mapping between different shifts used by UEs 115 for the transmission of ACK and NACK. In some cases, the mapping may be predetermined.

In some cases, there may be interference from the different UEs 115 that are multiplexed on a same RB. For example, in cases where there is a physical downlink shared channel (PDSCH) decoding rate of 90 percent for a first transmission, 90 percent of the ACK channel may be used for an ACK hypothesis (e.g., across all UEs 115). If two UEs 115 use the same or similar shifts, then the respective UEs 115 may experience interference from each other.

Accordingly, techniques may be used to mitigate interference by different UEs 115. In some cases, there may a randomized hypothesis mapping used, which may randomize interference. Alternatively, and as described herein, there may a randomization of shift sequences used to generate an uplink control message, which may also randomize the interference. In some examples, a randomized hypothesis mapping may introduce additional pseudo-random sequences, potentially resulting in greater complexity than the use of a random initial shift.

The initial shift may be UE-specific and may be indicated using various techniques. For instance, the initial shift may be explicitly indicated or implicitly mapped, or a combination thereof. As an example, there may be an explicit indication using a certain number of bits in a downlink control message. In such cases, ACK/NACK resource indicator or ARI bits may be used for the explicit indication of the random initial shift. In such cases, there may be Y configured resources (e.g., configured using RRC signaling) for a UE 115. As a result, X ARI bits may be used to indicate one or more of the resources to use for PUCCH format 0, where $2^X \geq Y$. As an illustrative example, X=2, and Y=4 resources, and an ARI bit may indicate one of the 4 resources configured by the base station 105. In some cases, multiple resources may include different shifts with other parameters being the same. Accordingly, the ARI bits may indicate different initial shifts for different transmissions (e.g., on respective resources). In such cases, different initial shifts may be indicated by different ARI bit values.

Additionally or alternatively, there may be an implicit mapping based on a CCE index of a downlink grant control message (e.g., received by the UE 115 on a PDCCH). In such cases, there may be an implicit mapping where there are no ARI bits included in DCI, and the UE 115 may instead rely on the CCE index to derive an RB index and the shift index. For each transmission, a PDCCH may be randomized, therefore the initial shifts may also be randomized.

In another example, there may be a combination of explicit and implicit mapping. For example, when $2^X < Y$, X ARI bits may not be sufficient to select a particular resource from the Y resources. For instance, X=2 and Y=8 resources, the 2 ARI bits may not be sufficient to indicate a particular resource. As a result, a UE 115 may use X ARI bits to select a subset of resources (e.g., with ceil $Y/2^X$ resources) and may then use the CCE index to select one of the resources in the subset. For instance, each subset may have two resources, and the CCE index may be used to identify a particular resource. In other words, subsets of resources may be implicitly indicated and resources within the subsets may be implicitly mapped. In some cases, different subsets may correspond to the same or different initial shift. Additionally or alternatively, different resources within the same subset may correspond to the same or different initial shift. As such, randomized shifts may be associated with a resource allocation based on ARI bits, a CCE index, or a combination thereof, and the randomization may be achieved through the selection of a resource within a subset of resources.

Using the techniques described herein, the use of the UE-specific initial shift may enable different shifts to be used for different hypothesis 200 and used by different UEs 115. For instance, when transmitting using the second hypothesis 200-*b*, a given UE 115 may use a particular shift for the transmission of ACK/NACK for 1-bit ACKs, whereas another UE 115 may use a different shift, thereby randomizing interference for both UEs 115. Likewise, with the UE-specific shifts 201, the transmissions of ACK/NACK (or scheduling requests) may also include randomized sequences based on the initial shift used by each UE 115. Such techniques may enable a greater probability that interference may be randomized between respective UEs 115 (e.g., UEs 115 that are multiplexed on the same resources).

Figure 3:
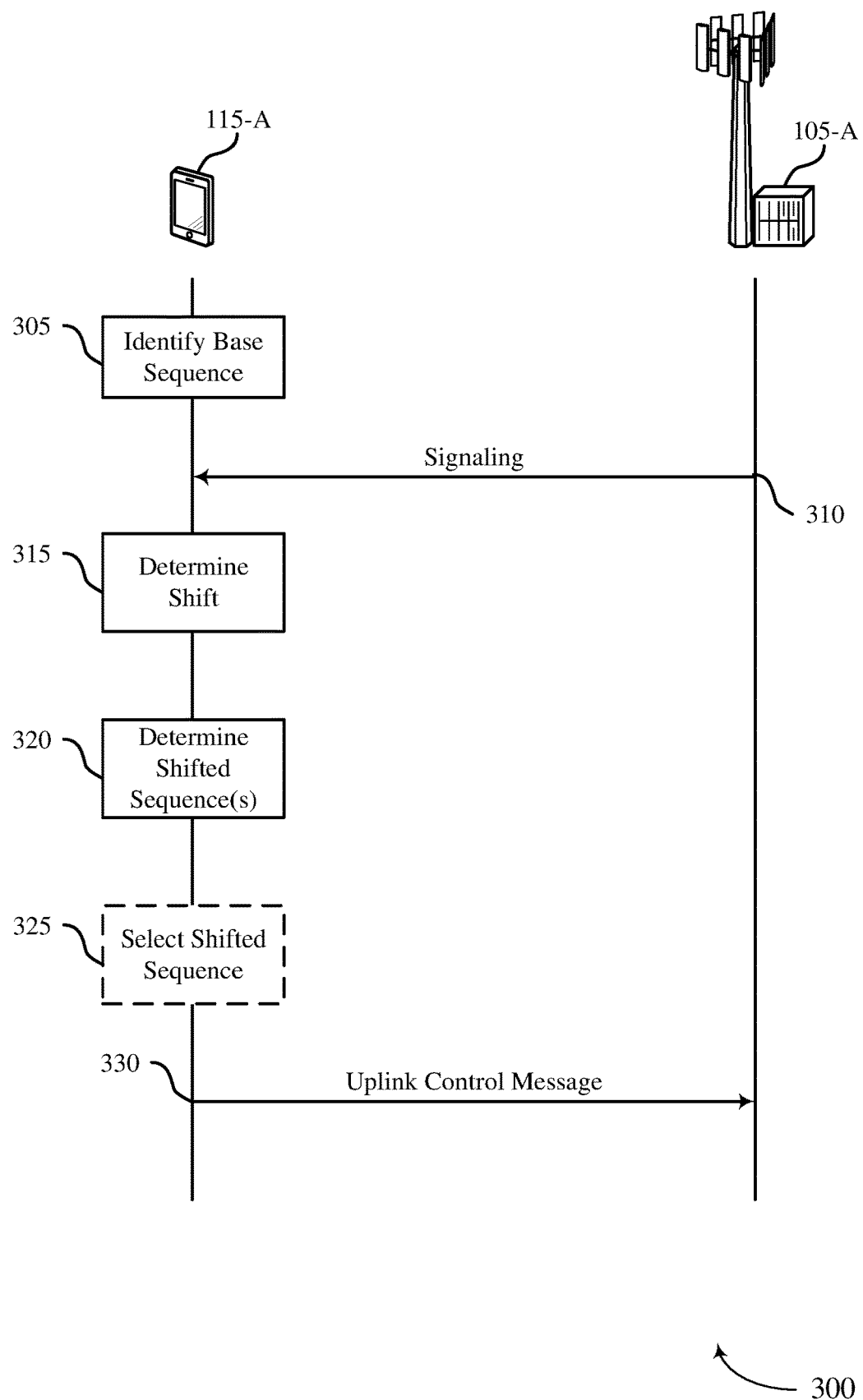
FIG. 3 illustrates an example of a process flow that supports UE shift randomization for uplink control channel transmission in accordance with aspects of the present disclosure.

FIG. 3 illustrates an example of a process flow 300 in a system that supports UE shift randomization for uplink control channel transmission in accordance with various aspects of the present disclosure. In some examples, process flow 300 may implement aspects of wireless communications system 100. For instance, process flow 300 includes a UE 115-*a* and base station 105-*a*, which may be examples of the corresponding devices described with reference to FIG. 1. Process flow 300 may illustrate the randomization of sequences to efficiently reduce interference between wireless devices transmitting on resources within a cell.

At 305, UE 115-*a* may identify a base sequence for transmission in an uplink control message. At 310, base station 105-*a* may transmit, and UE 115-*a* may receive, signaling indicative of a UE-specific initial shift to be applied to (e.g., utilized with) the base sequence. In some cases, base station 105-*a* may transmit signaling to different UEs 115 (e.g., including UE 115-*a*), and the signaling may be indicative of different UE-specific initial shifts to be applied to the base sequence by respective UEs 115 such that interference between transmissions of uplink control messages is randomized. In some cases, shifted sequences used when generating an uplink control payload may be randomized for respective transmissions, and different transmissions by respective UEs 115 may use different shifts. In such cases, sequences may be efficiently randomized with minimal complexity.

For example, UE 115-*a* may receive an explicit indication of the UE-specific initial shift. In some examples, the explicit indication is included within ARI bits of a downlink DCI message transmitted by base station 105-a. A number of the ARI bits may be sufficiently large such that two raised to the number of the ARI bits is greater than or equal to a number of resources configured for the uplink control message. That is, $2^X \geq Y$, as described above.

In some examples, receiving the signaling indicative of the UE-specific initial shift includes receiving a downlink grant control message having a CCE index from which the UE-specific initial shift is determined. In such cases, an RB index and a shift index for the UE-specific initial shift may be derived based on the CCE index of the downlink grant control message.

Additionally or alternatively, receiving the signaling includes receiving an explicit indication of a subset of resources configured for the uplink control message and receiving a downlink grant control message having a CCE index. Accordingly, UE 115-a may derive an RB index and shift index for the UE-specific initial shift based at least in part on the CCE index as applied to the subset of resources. In some examples, the explicit indication is included within ARI bits of a DCI message. In some cases, a number of the ARI bits is such that two raised to the number of the ARI bits is less than a number of the resources configured for the uplink control message. That is, $2^X < Y$, as described above. In some examples, at 315, UE 115-a may determine the UE-specific initial shift based on the signaling. At 320, UE 115-a may determine one or more shifted sequences based on the UE-specific initial shift and the base sequence. In some examples, UE 115-a may determine information included in the uplink control message (e.g., a payload including a 1-bit ACK, 2-bit ACK, an SR, etc.), and may determine a shifted sequence based on the information included in the uplink control message. For example, as mentioned above, PUCCH Format 0 may be associated with sPUCCH transmissions, which may include uplink control information (e.g., SR, ACK/NACK, etc.) with 1 or 2 bits. UE 115-a may thus determine the number of bits in the uplink control information to be sent using sPUCCH, and the shifted sequence may be based on the number of bits of the payload as described with reference to FIGS. 2A and 2B. Accordingly, UE 115-a may determine the shifted sequence based on the UE-specific initial shift, the base sequence, and the number of bits of uplink control information to be set using the uplink control message. In some examples, at 325, UE 115-a may select a shifted sequence from one or more shifted sequences based at least in part on the payload of the uplink control message. In some examples, selecting the shifted sequence from the one or more shifted sequences based on the payload of the uplink control message may include identifying that the payload of the uplink control message is one of an SR, a 1-bit ACK, or a 2-bit ACK, and then selecting a shifted sequence based at least in part on the identified payload. In some cases, UE 115-a may randomize the selecting of the shifted sequence from the one or more shifted sequences.

At 330, UE 115-a may transmit, and base station 105-a may receive, uplink control information in the uplink control message based on the shifted sequence. For example, the uplink control message may comprise the shifted sequence that is mapped to physical resources (e.g., REs) for transmission to base station 105-a. In some cases, the uplink control message may be formatted as an sPUCCH message having one or two bits of uplink control information.

Figure 4:
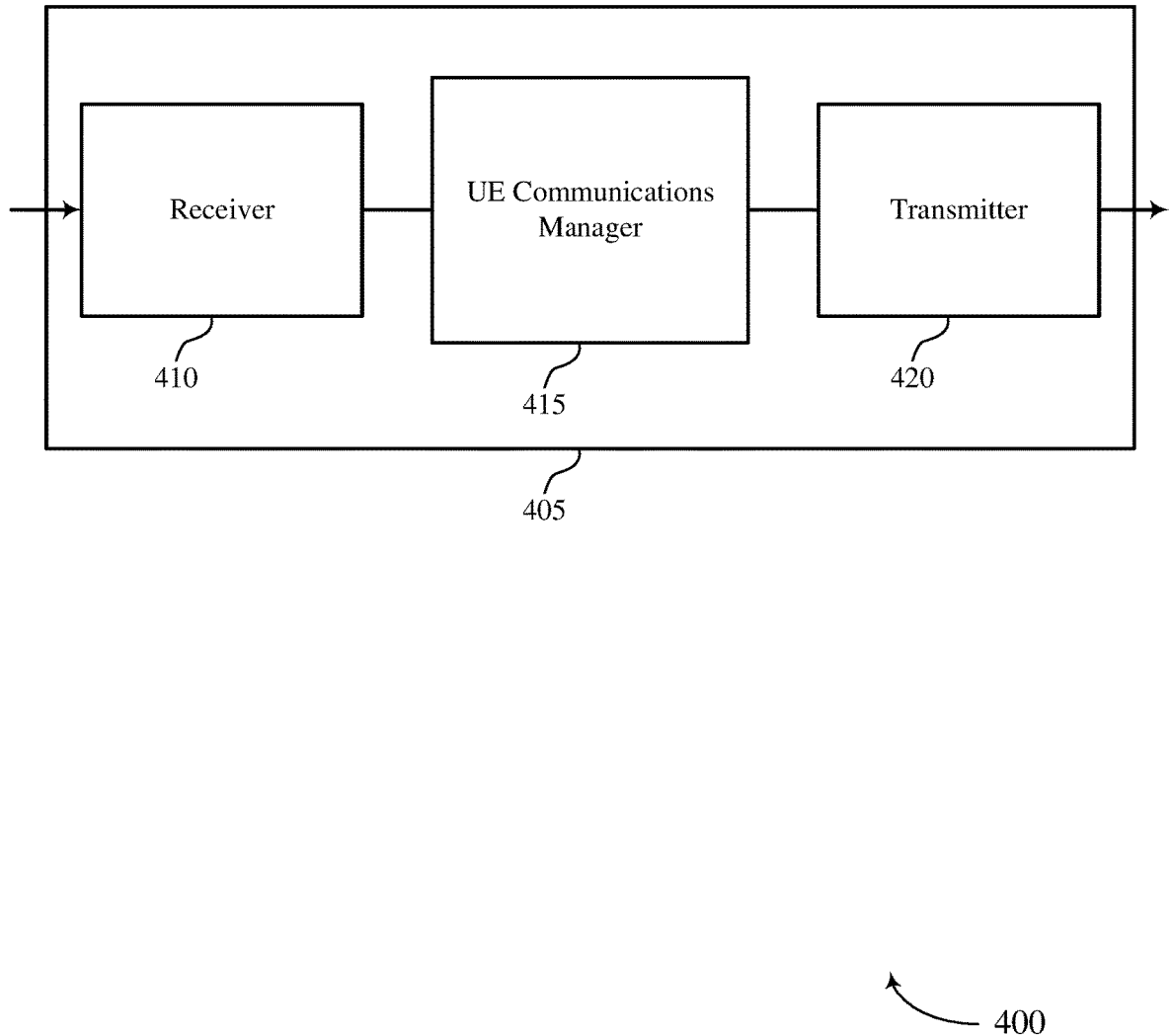
FIGS. 4 through 6 show block diagrams of a device that supports UE shift randomization for uplink control channel transmission in accordance with aspects of the present disclosure.

FIG. 4 shows a block diagram 400 of a wireless device 405 that supports UE shift randomization for uplink control channel transmission in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to UE shift randomization for uplink control channel transmission, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may identify a base sequence for transmission of an uplink control message, receive signaling indicative of a UE-specific initial shift to be used with the base sequence, and determine the UE-specific initial shift based on the signaling. In some cases, UE communications manager 415 may determine uplink control information based for the uplink control message, determine a shifted sequence of the base sequence based on the UE-specific initial shift and the uplink control information, and transmit the uplink control information in the uplink control message, where the uplink control information is based on the shifted sequence.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
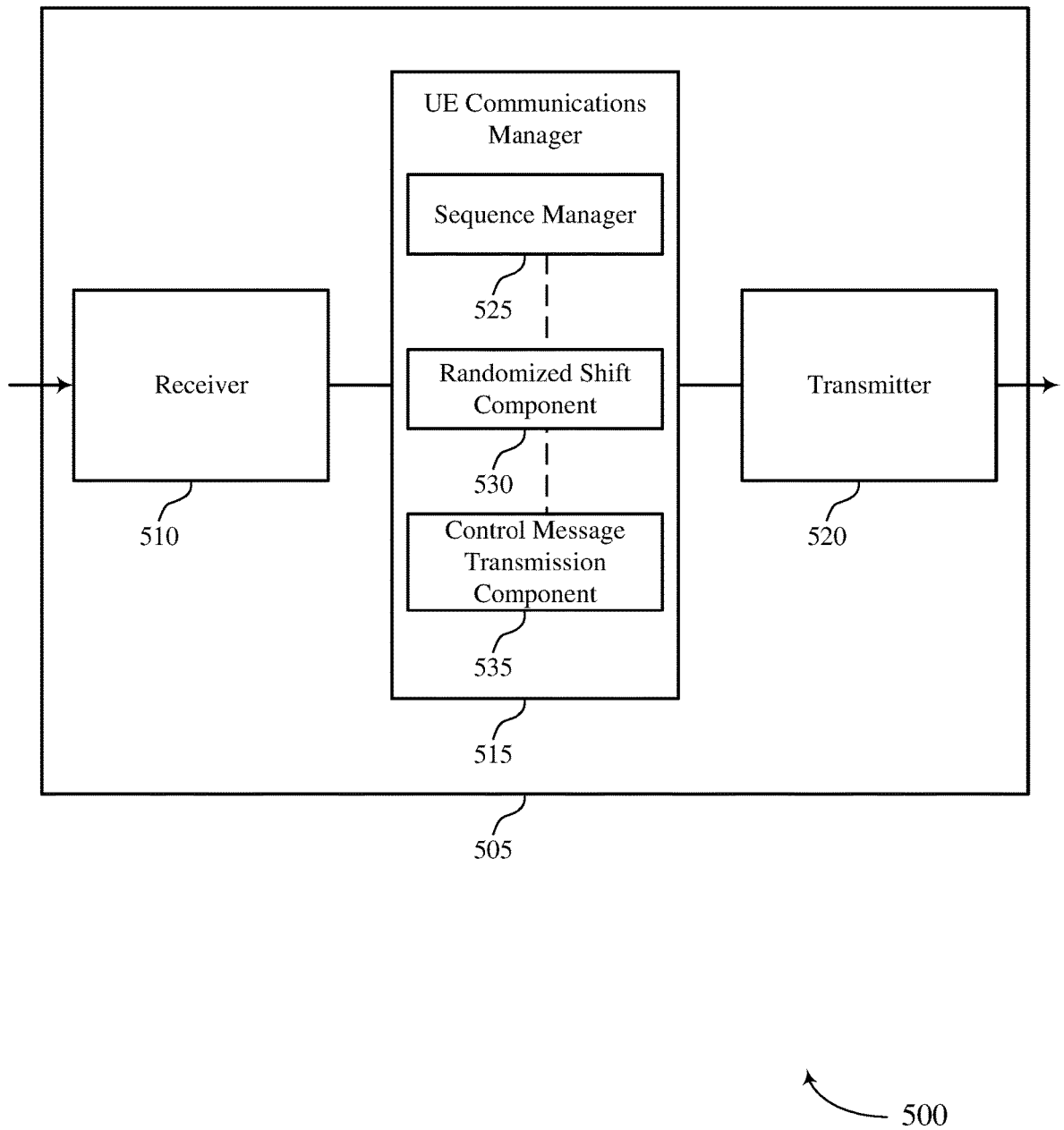

FIG. 5 shows a block diagram 500 of a wireless device 505 that supports UE shift randomization for uplink control channel transmission in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to UE shift randomization for uplink control channel transmission, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include sequence manager 525, randomized shift component 530, and control message transmission component 535.

Sequence manager 525 may identify a base sequence for transmission in an uplink control message, determine one or more shifted sequences based on the UE-specific initial shift and the base sequence, and select a shifted sequence from the one or more shifted sequences based on a payload of the uplink control message. In some examples, sequence manager 525 may select the shifted sequence based on the identified payload. In some examples, sequence manager 525 may determine a shifted sequence of the base sequence based on the UE-specific initial shift and the uplink control information. In some examples, sequence manager 525 may randomize the selecting of the shifted sequence from the one or more shifted sequences. In some cases, selecting the shifted sequence from the one or more shifted sequences based on the payload of the uplink control message includes identifying that the payload of the uplink control message is one of an SR, a one-bit ACK, or a two-bit ACK.

Randomized shift component 530 may receive signaling that indicates (e.g., is indicative of) a UE-specific initial shift to be applied to the base sequence and determine the UE-specific initial shift based on the signaling. In some cases, receiving signaling indicative of the UE-specific initial shift includes receiving an explicit indication of the UE-specific initial shift. In some cases, the explicit indication is included within ARI bits of a DCI message. In some cases, a number of the ARI bits is sufficiently large such that two raised to the number of the ARI bits is greater than a number of resources configured for the uplink control message.

In some cases, receiving signaling indicative of the UE-specific initial shift includes receiving a downlink grant control message having a CCE index from which the UE-specific initial shift is derived. In some cases, determining the UE-specific initial shift includes deriving an RB index and shift index for the UE-specific initial shift based on the CCE index of the downlink grant control message. In some cases, receiving signaling indicative of the UE-specific initial shift includes receiving an explicit indication of a subset of resources configured for the uplink control message. In some cases, the explicit indication is included within ARI bits of a DCI message. In some cases, a number of the ARI bits is such that two raised to the number of the ARI bits is less than a number of the resources configured for the uplink control message.

Control message transmission component 535 may transmit the selected shifted sequence in the uplink control message. In some examples, control message transmission component 535 may determine a number of bits of uplink control information based on a payload of the uplink control message. In some examples, control message transmission component 535 may transmit the uplink control information in the uplink control message, wherein the uplink control message is based on the shifted sequence. In some cases, the uplink control message is formatted as an sPUCCH message having only one or two bits of uplink control information.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
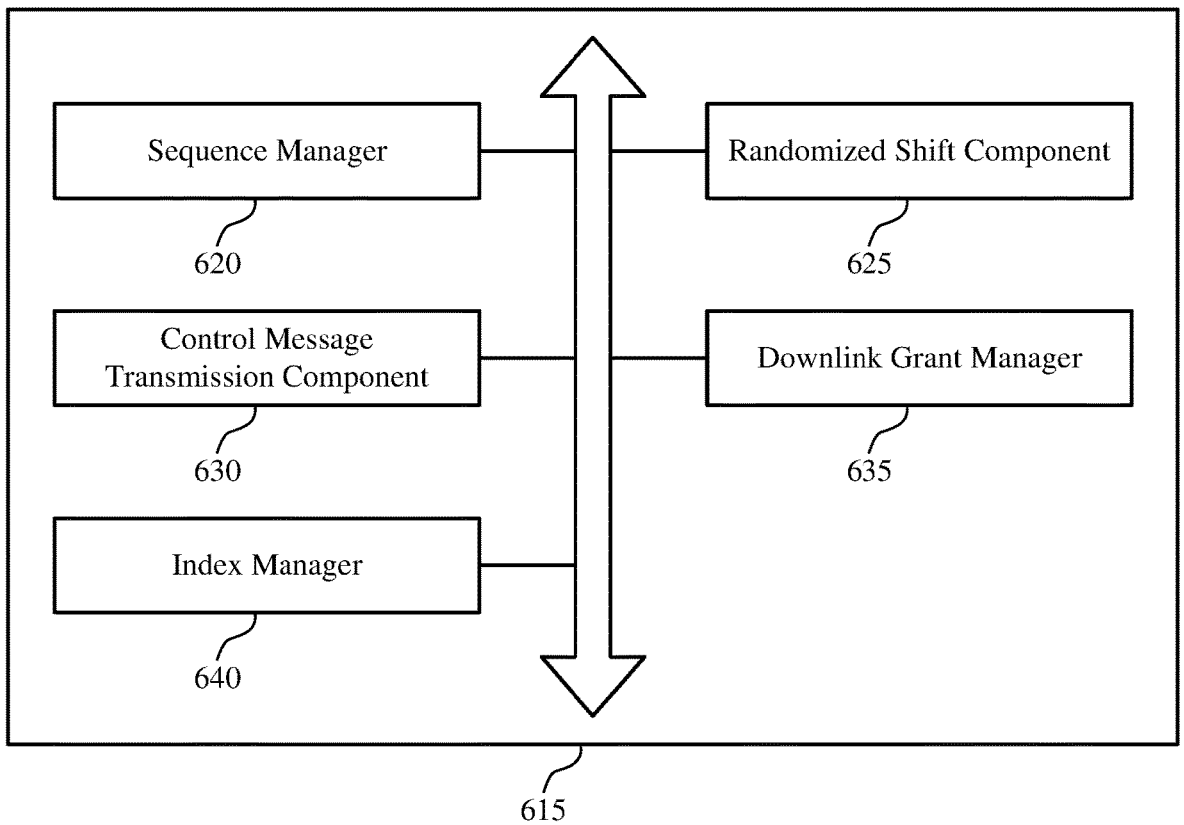

FIG. 6 shows a block diagram 600 of a UE communications manager 615 that supports UE shift randomization for uplink control channel transmission in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include sequence manager 620, randomized shift component 625, control message transmission component 630, downlink grant manager 635, and index manager 640. Each of these modules may communicate, directly or indirectly, with one another (e.g., via one or more buses).

Sequence manager 620 may identify a base sequence for transmission in an uplink control message, determine one or more shifted sequences based on the UE-specific initial shift and the base sequence, select a shifted sequence from the one or more shifted sequences based on a payload of the uplink control message, select the shifted sequence based on the identified payload, and randomize the selecting of the shifted sequence from the one or more shifted sequences. In some examples, sequence manager 620 may determine a shifted sequence based on the UE-specific initial shift, a number of bits of the uplink control information, and the base sequence. In some examples, sequence manager 620 may In some examples, sequence manager 620 may determine the shifted sequence based at least in part on a shift value that corresponds to the payload the uplink control information, the shift value comprising a value of 0 or 6. In some examples, sequence manager 620 may determine the shifted sequence based at least in part on a shift value that corresponds to the payload the uplink control information, the shift value comprising a value of 0, 3, 6, or 9. In some cases, selecting the shifted sequence from the one or more shifted sequences based on the payload of the uplink control message includes identifying that the payload of the uplink control message includes an SR, a one-bit ACK, a two-bit ACK, or the like.

Randomized shift component 625 may receive signaling indicative of a UE-specific initial shift to be applied to the base sequence and determine the UE-specific initial shift based on the signaling. In some cases, receiving signaling indicative of the UE-specific initial shift includes receiving an explicit indication of the UE-specific initial shift. In some cases, the explicit indication is included within ARI bits of a DCI message. In some cases, a number of the ARI bits is sufficiently large such that two raised to the number of the ARI bits is greater than a number of resources configured for the uplink control message.

In some cases, receiving signaling indicative of the UE-specific initial shift includes receiving a downlink grant control message having a CCE index from which the UE-specific initial shift is derived. In some cases, determining the UE-specific initial shift includes deriving an RB index and shift index for the UE-specific initial shift based on the CCE index of the downlink grant control message. In some cases, receiving signaling indicative of the UE-specific initial shift includes receiving an explicit indication of a subset of resources configured for the uplink control message. In some cases, the explicit indication is included within ARI bits of a DCI message. In some cases, a number of the ARI bits is such that two raised to the number of the ARI bits is less than a number of the resources configured for the uplink control message.

Control message transmission component 630 may transmit the selected shifted sequence in the uplink control message. In some examples, control message transmission component 630 may determine a number of bits of uplink control information based on a payload of the uplink control message. In some examples, control message transmission component 630 may transmit the uplink control information in the uplink control message, wherein the uplink control message is based on the shifted sequence. In some examples, control message transmission component 630 may determine a size of acknowledgment information in the uplink control information. In some cases, the uplink control message is formatted as an sPUCCH message having only one or two bits of uplink control information.

Downlink grant manager 635 may receive a downlink grant control message having a CCE index. Index manager 640 may derive an RB index and shift index for the UE-specific initial shift based on the CCE index as applied to the subset of resources.

Figure 7:
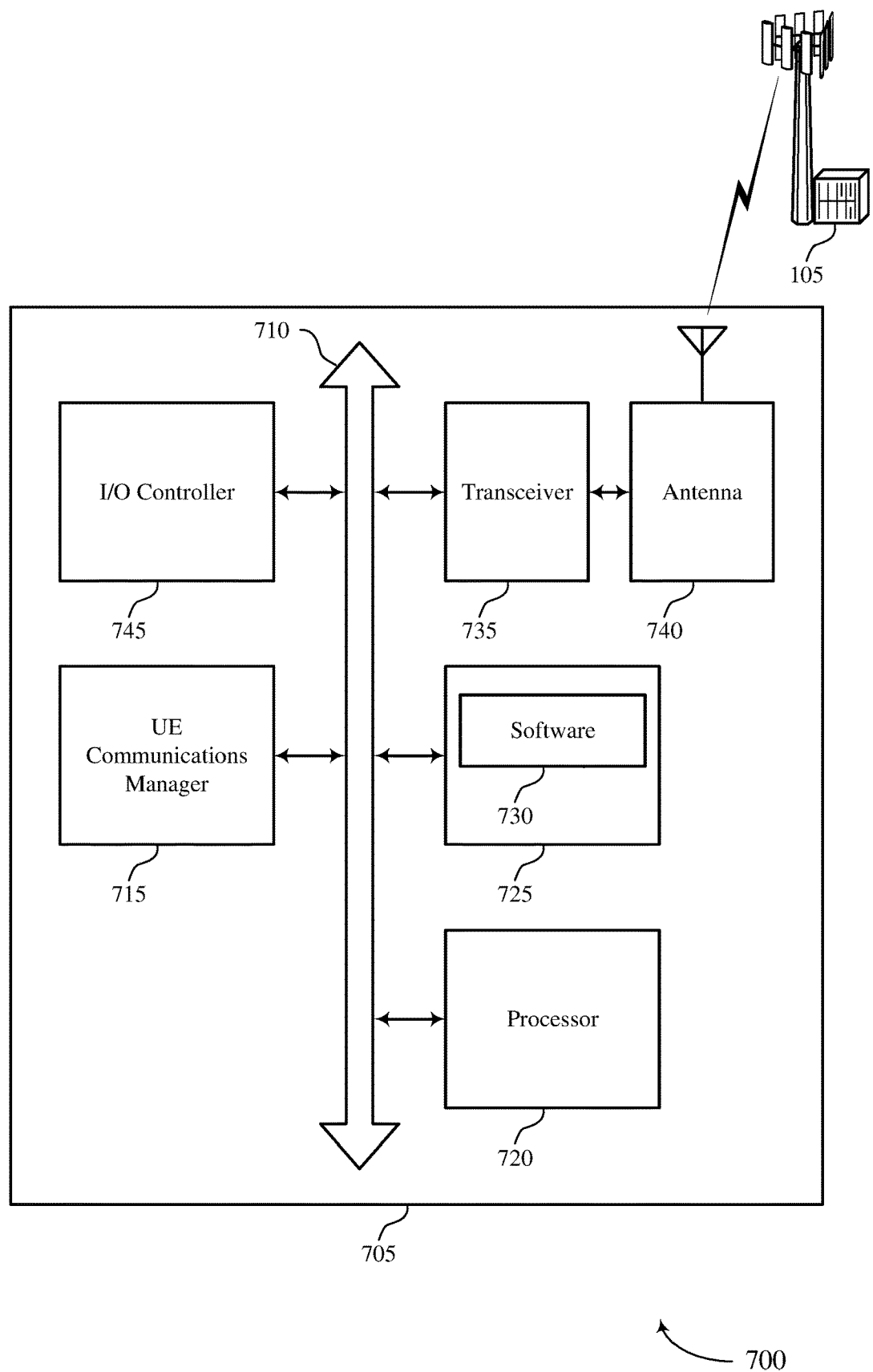
FIG. 7 illustrates a block diagram of a system including a UE that supports UE shift randomization for uplink control channel transmission in accordance with aspects of the present disclosure.

FIG. 7 shows a diagram of a system 700 including a device 705 that supports UE shift randomization for uplink control channel transmission in accordance with aspects of the present disclosure. Device 705 may be an example of or include the components of wireless device 405, wireless device 505, or a UE 115 as described herein, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting UE shift randomization for uplink control channel transmission).

Memory 725 may include random-access memory (RAM) and read-only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support UE shift randomization for uplink control channel transmission. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described herein. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases, the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
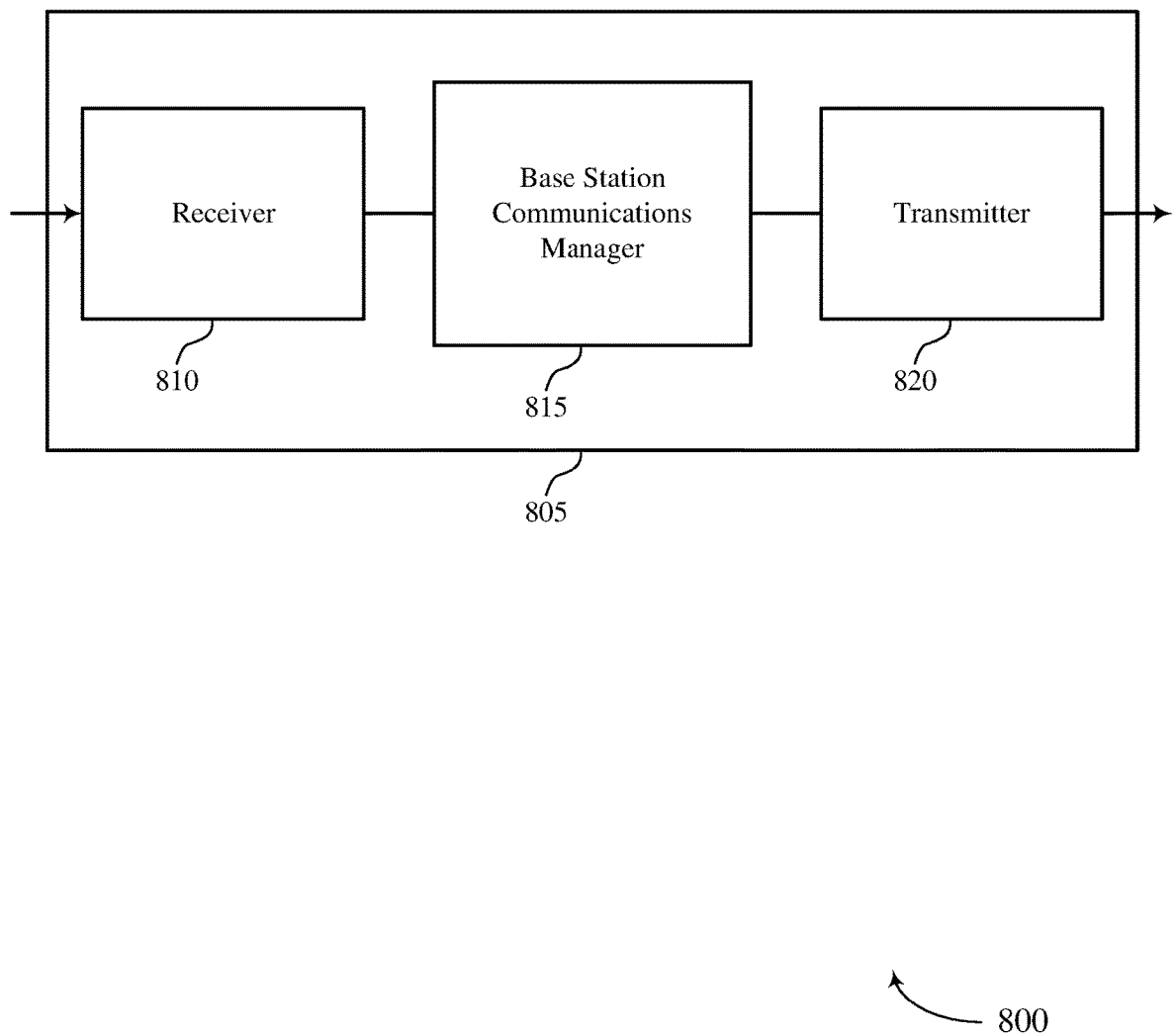
FIGS. 8 through 10 show block diagrams of a device that supports UE shift randomization for uplink control channel transmission in accordance with aspects of the present disclosure.

FIG. 8 shows a block diagram 800 of a wireless device 805 that supports UE shift randomization for uplink control channel transmission in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to UE shift randomization for uplink control channel transmission, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may transmit, to a UE 115, signaling that indicates a UE-specific initial shift to be applied to a base sequence for transmission of an uplink control message and receive uplink control information in the uplink control message, where the uplink control information is based on a shifted sequence that is shifted with respect to the base sequence in accordance with the UE-specific initial shift and a payload of the uplink control information.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
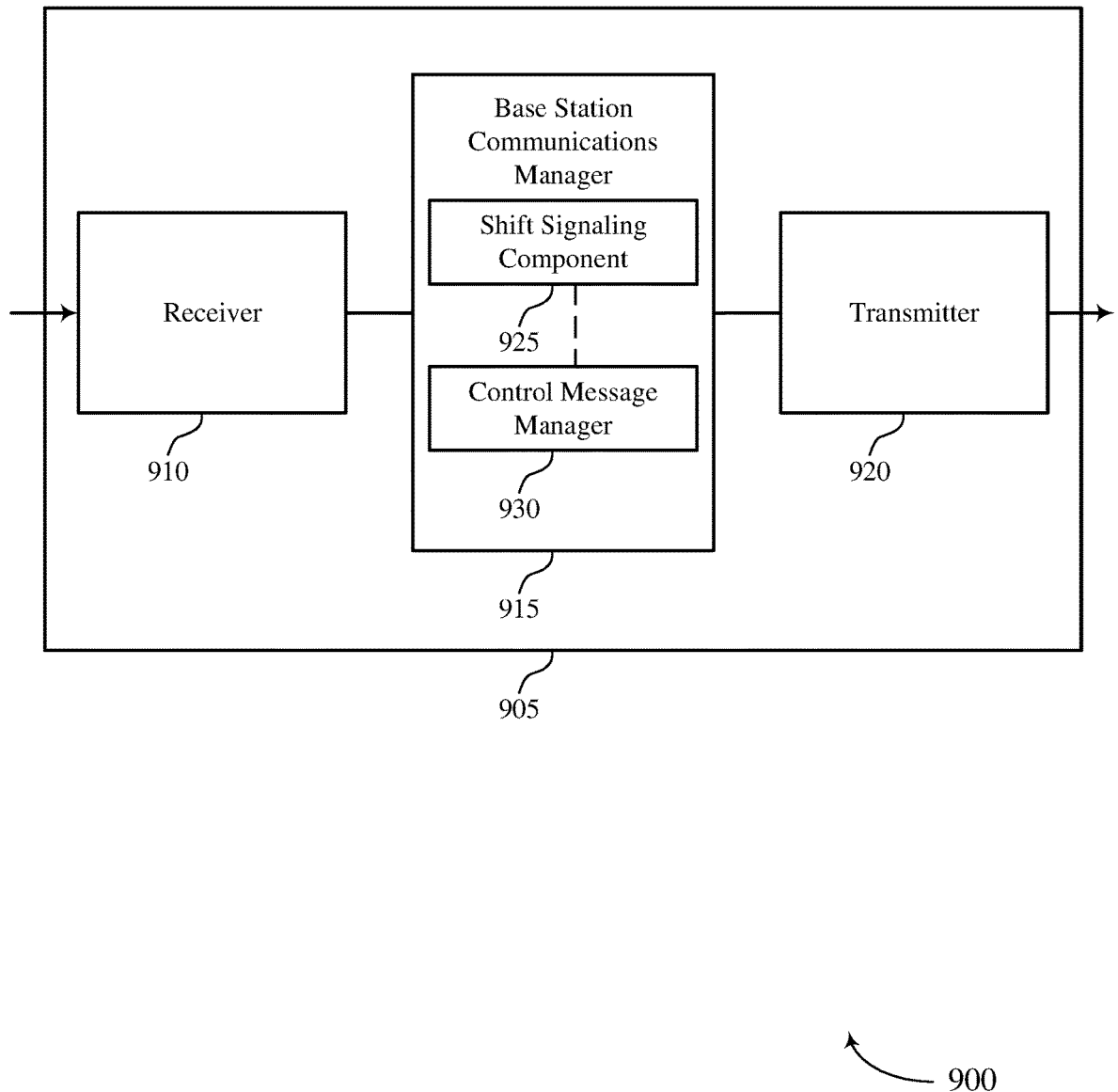

FIG. 9 shows a block diagram 900 of a wireless device 905 that supports UE shift randomization for uplink control channel transmission in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UE shift randomization for uplink control channel transmission, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include shift signaling component 925 and control message manager 930.

Shift signaling component 925 may transmit, to a UE 115, signaling indicative of a UE-specific initial shift to be applied to a base sequence for transmission of an uplink control message. In some cases, shift signaling component 925 may transmit signaling to different UEs 115, where the signaling may be indicative of different UE-specific initial shifts to be applied to the base sequence by each of the different UEs 115 such that interference between transmissions of uplink control messages is randomized. In some cases, transmitting signaling indicative of the UE-specific initial shift includes transmitting an explicit indication of the UE-specific initial shift.

In some cases, the explicit indication is included within ARI bits of a DCI message. In some cases, a number of the ARI bits is sufficiently large such that two raised to the number of the ARI bits is greater than a number of resources configured for the uplink control message. In some cases, transmitting signaling indicative of the UE-specific initial shift includes transmitting a downlink grant control message having a CCE index from which the UE-specific initial shift is derived. In some cases, transmitting signaling indicative of the UE-specific initial shift includes transmitting an explicit indication of a subset of resources configured for the uplink control message. In some cases, the explicit indication is included within ARI bits of a DCI message and a number of the ARI bits is such that two raised to the number of the ARI bits is less than a number of the resources configured for the uplink control message.

Control message manager 930 may receive, in the uplink control message, a shifted sequence that is shifted with respect to the base sequence in accordance with the UE-specific initial shift. In some examples, control message manager 930 may receive uplink control information in the uplink control message, where the uplink control information is based on a shifted sequence that is shifted with respect to the base sequence in accordance with the UE-specific initial shift and a payload of the uplink control information. In some cases, the uplink control message is formatted as an sPUCCH message having only one or two bits of uplink control information.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
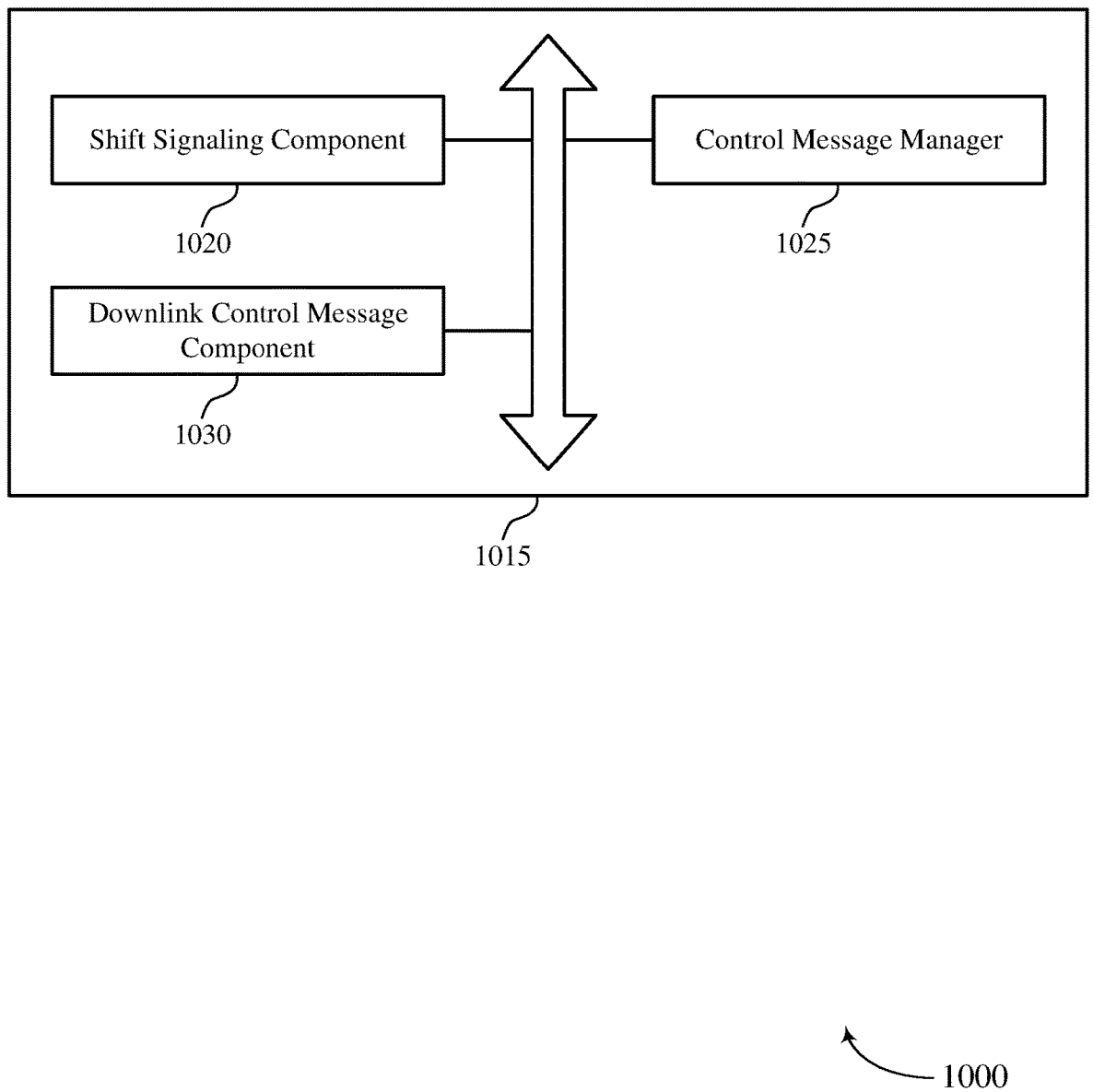

FIG. 10 shows a block diagram 1000 of a base station communications manager 1015 that supports UE shift randomization for uplink control channel transmission in accordance with aspects of the present disclosure. The base station communications manager 1015 may be an example of aspects of a base station communications manager 1115 described with reference to FIGS. 8, 9, and 11. The base station communications manager 1015 may include shift signaling component 1020, control message manager 1025, and downlink control message component 1030. Each of these modules may communicate, directly or indirectly, with one another (e.g., via one or more buses).

Shift signaling component 1020 may transmit, to a UE 115, signaling that indicates a UE-specific initial shift to be applied to a base sequence for transmission of an uplink control message and transmit additional signaling to different UEs 115. In some cases, the additional signaling may be indicative of different UE-specific initial shifts to be applied to the base sequence by the different UEs 115 such that interference between transmissions of uplink control messages is randomized.

In some examples, transmitting the signaling that indicates the UE-specific initial shift includes transmitting an explicit indication of the UE-specific initial shift. In some cases, the explicit indication is included within ARI bits of a DCI message, where a number of the ARI bits is sufficiently large such that two raised to the number of the ARI bits is greater than a number of resources configured for the uplink control message. In some cases, transmitting signaling indicative of the UE-specific initial shift includes transmitting a downlink grant control message having a CCE index from which the UE-specific initial shift is derived. In some cases, transmitting signaling indicative of the UE-specific initial shift includes transmitting an explicit indication of a subset of resources configured for the uplink control message. In some cases, the explicit indication is included within ARI bits of a DCI message. In some cases, a number of the ARI bits is such that two raised to the number of the ARI bits is less than a number of the resources configured for the uplink control message.

Control message manager 1025 may receive, in the uplink control message, a shifted sequence that is shifted with respect to the base sequence in accordance with the UE-specific initial shift. In some cases, the uplink control message is formatted as an sPUCCH message having only one or two bits of uplink control information.

Downlink control message component 1030 may transmit a downlink grant control message having a CCE index, such that an RB index and shift index for the UE-specific initial shift is able to be derived based on the CCE index as applied to the subset of resources.

Figure 11:
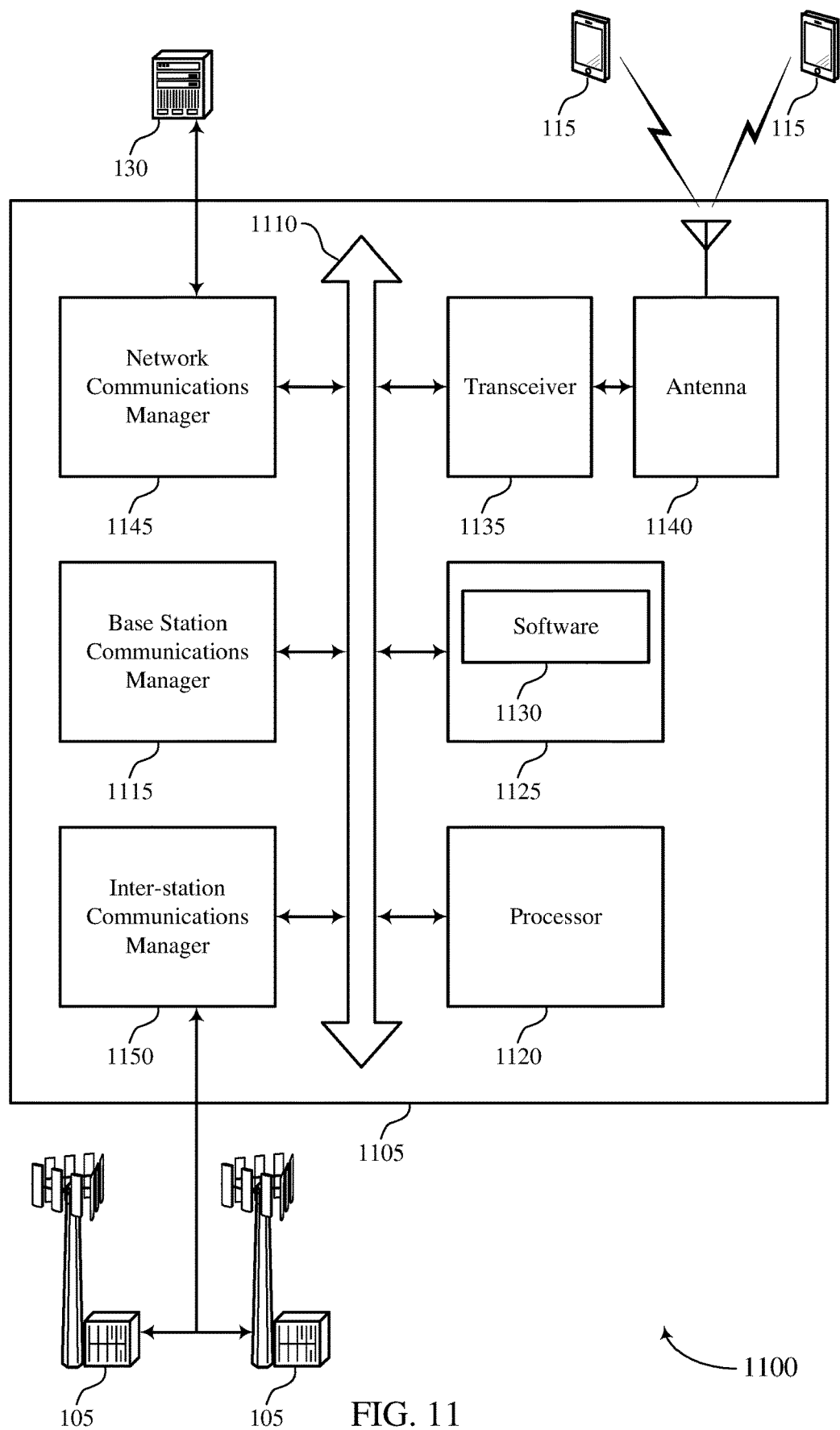
FIG. 11 illustrates a block diagram of a system including a base station that supports UE shift randomization for uplink control channel transmission in accordance with aspects of the present disclosure.

FIG. 11 shows a diagram of a system 1100 including a device 1105 that supports UE shift randomization for uplink control channel transmission in accordance with aspects of the present disclosure. Device 1105 may be an example of or include the components of base station 105 as described herein, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting UE shift randomization for uplink control channel transmission).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support UE shift randomization for uplink control channel transmission. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases, the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a Long Term Evolution (LTE)/LTE-A wireless communication network technology to provide communication between base stations 105.

Figure 12:
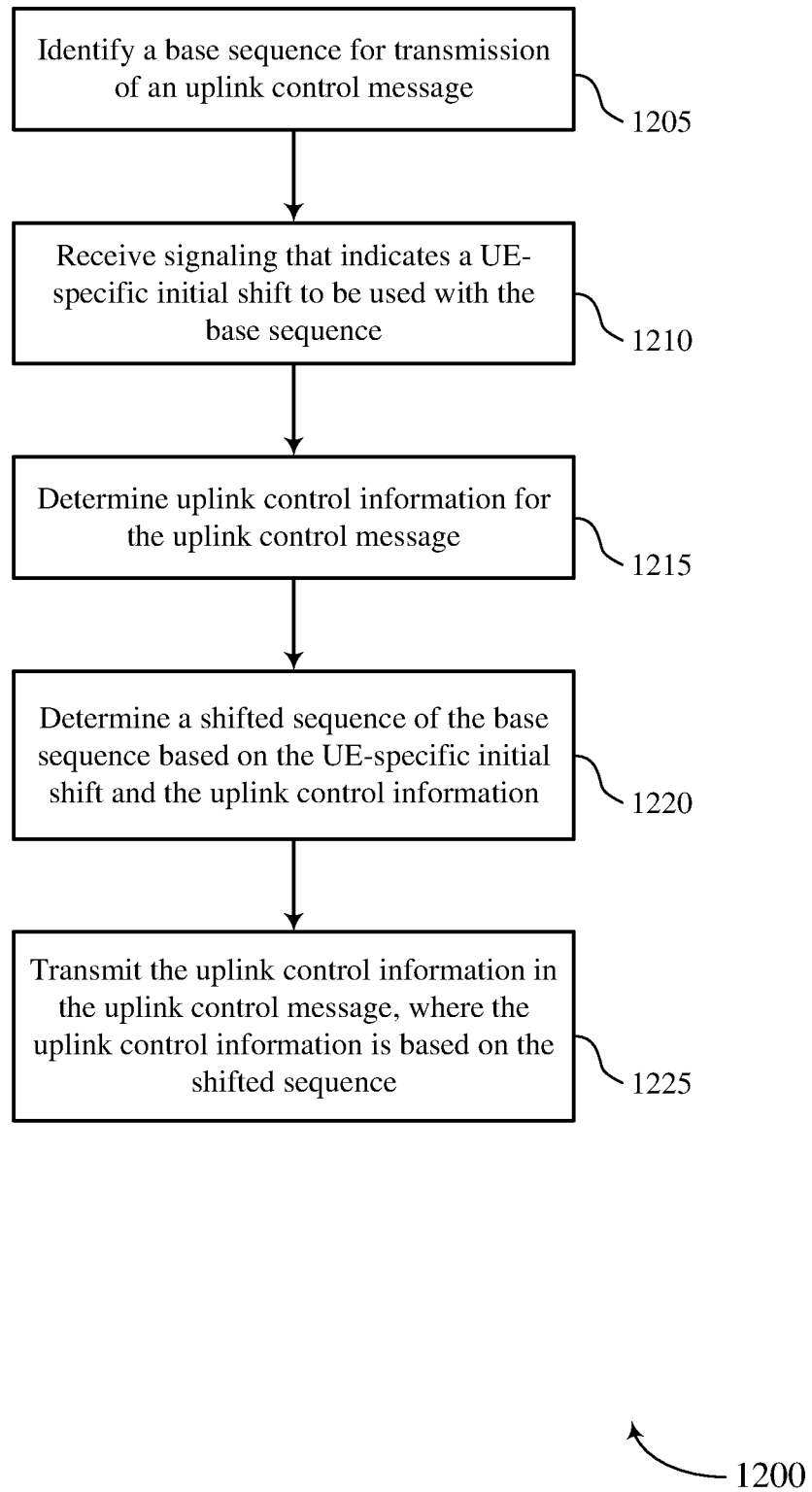
FIGS. 12 through 13 illustrate methods for UE shift randomization for uplink control channel transmission in accordance with aspects of the present disclosure.

FIG. 12 shows a flowchart illustrating a method 1200 for UE shift randomization for uplink control channel transmission in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 1205 the UE 115 may identify a base sequence for transmission of an uplink control message. The operations of 1205 may be performed according to the methods described herein. In certain examples, aspects of the operations of 1205 may be performed by a sequence manager as described with reference to FIGS. 4 through 7.

At 1210 the UE 115 may receive signaling that indicates a UE-specific initial shift to be used with the base sequence. The operations of 1210 may be performed according to the methods described herein. In certain examples, aspects of the operations of 1210 may be performed by a randomized shift component as described with reference to FIGS. 4 through 7.

At 1215 the UE 115 may determine uplink control information for the uplink control message. The operations of 1215 may be performed according to the methods described herein. In certain examples, aspects of the operations of 1230 may be performed by a control message transmission component as described with reference to FIGS. 4 through 7.

At 1220 the UE 115 may determine a shifted sequence of the base sequence based at least in part on the UE-specific initial shift and the uplink control information. The operations of 1220 may be performed according to the methods described herein. In certain examples, aspects of the operations of 1220 may be performed by a sequence manager as described with reference to FIGS. 4 through 7.

At 1225 the UE 115 may transmit the uplink control information in the uplink control message, where the uplink control information is based on the shifted sequence. The operations of 1225 may be performed according to the methods described herein. In certain examples, aspects of the operations of 1225 may be performed by a control message transmission component as described with reference to FIGS. 4 through 7.

Figure 13:
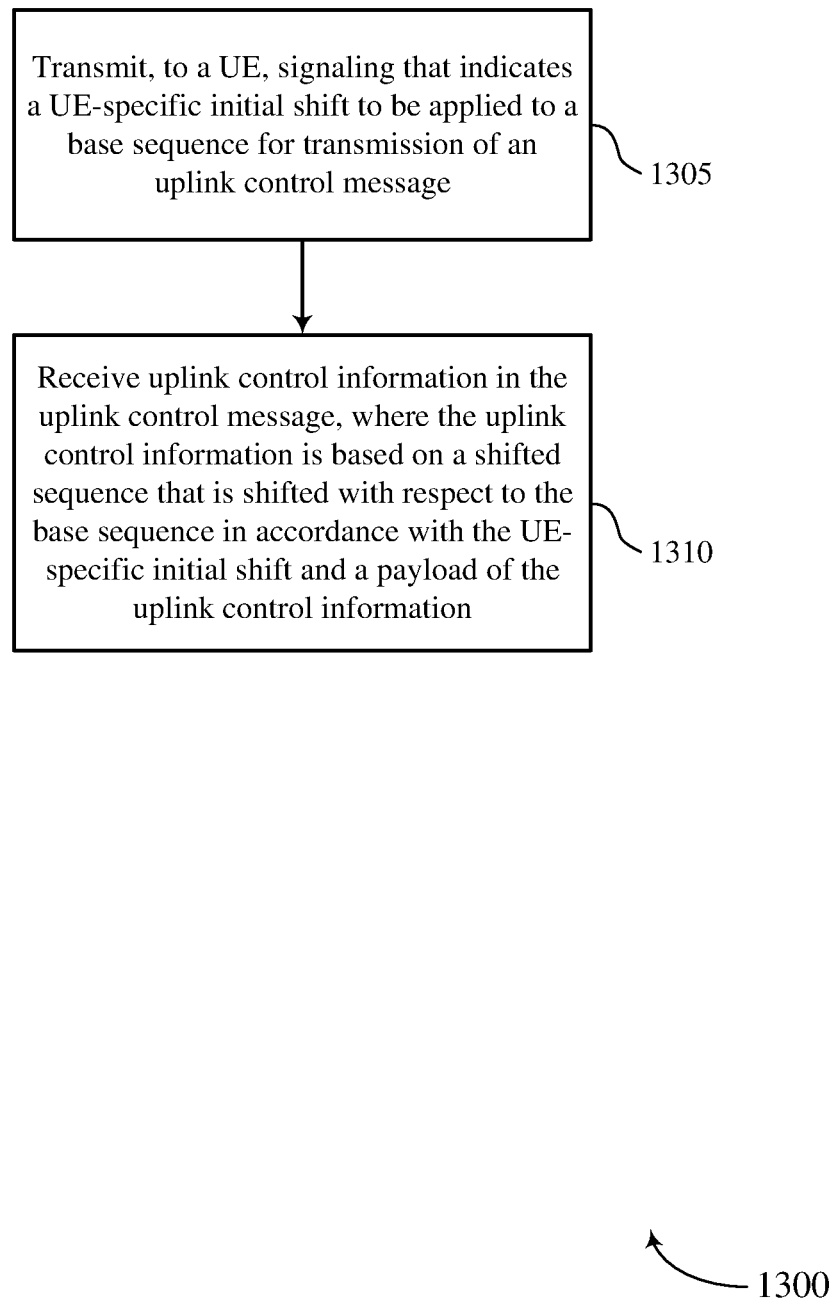

FIG. 13 shows a flowchart illustrating a method 1300 for UE shift randomization for uplink control channel transmission in accordance with aspects of the present disclosure. The operations of method 1300 may be implemented by a base station 105 or its components as described herein. For example, the operations of method 1300 may be performed by a base station communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At 1305 the base station 105 may transmit, to a UE 115, signaling that indicates a UE-specific initial shift to be applied to a base sequence for transmission of an uplink control message. The operations of 1305 may be performed according to the methods described herein. In certain examples, aspects of the operations of 1305 may be performed by a shift signaling component as described with reference to FIGS. 8 through 11.

At 1310 the base station 105 may receive uplink control information in the uplink control message, where the uplink control information is based on a shifted sequence that is shifted with respect to the base sequence in accordance with the UE-specific initial shift and a payload of the uplink control information. The operations of 1310 may be performed according to the methods described herein. In certain examples, aspects of the operations of 1310 may be performed by a control message manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields, optical fields, particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) comprising:
    identifying a base sequence for transmission of an uplink control message;
    receiving signaling that indicates a UE-specific initial shift to be used with the base sequence, the signaling comprising:
        an indication of a subset of resources for the uplink control message included within acknowledgment (ACK) resource indicator (ARI) bits of a downlink control information (DCI) message; and
        a downlink grant control message having a control channel element (CCE) index;
    deriving a resource block (RB) index and a shift index for the UE-specific initial shift based at least in part on the CCE index as applied to the subset of resources;
    determining uplink control information (UCI) for the uplink control message;
    determining a shifted sequence of the base sequence based at least in part on the UE-specific initial shift and the UCI; and
    transmitting the UCI in the uplink control message based at least in part on the shifted sequence.

2. The method of claim 1, wherein the downlink grant control message comprises the DCI message.

3. The method of claim 2, wherein the UE receives the downlink grant control message on a physical downlink control channel (PDCCH).

4. The method of claim 1, wherein the uplink control message is formatted as a short physical uplink control channel message, and wherein a payload of the uplink control information comprises a one-bit ACK or a two-bit ACK.

5. The method of claim 1, wherein a number of the ARI bits X) is defined such that two raised to the number of the ARI bits ($2^X$) is less than a number of resources (Y) configured for the uplink control message ($2^X<Y$).

6. The method of claim 1, further comprising:
identifying that a payload of the uplink control information is one of a one-bit ACK or a two-bit ACK; and
determining the shifted sequence based at least in part on the identified payload.

7. The method of claim 1, wherein determining the shifted sequence of the base sequence further comprises:
determining a plurality of shifted sequences of the base sequence based at least in part on the UE-specific initial shift and the UCI; and
selecting the shifted sequence from the plurality of shifted sequences.

8. A user equipment (UE), comprising:
one or more memories storing processor-executable code; and
one or more processors coupled with the one or more memories and individually or collectively operable to execute the code to cause the UE to:
identify a base sequence for transmission of an uplink control message;
receive signaling that indicates a UE-specific initial shift to be used with the base sequence, the signaling comprising:
an indication of a subset of resources for the uplink control message include within acknowledgement (ACK) resource indicator (ARI) bits of a downlink control information (DCI) message; and
a downlink grant control message have a control channel element (CCE) index;
derive a resource block (RB) index and a shift index for the UE-specific initial shift based at least in part on the CCE index as applied to the subset of resources;
determine uplink control information (UCI) for the uplink control message;
determine a shifted sequence of the base sequence based at least in part on the UE-specific initial shift and the UCI; and
transmit the UCI in the uplink control message based at least in part on the shifted sequence.

9. The UE of claim 8, wherein the downlink grant control message comprises the DCI message.

10. The UE of claim 9, wherein the UE receives the downlink grant control message on a physical downlink control channel (PDCCH).

11. The UE of claim 8, wherein a payload of the uplink control message includes a 1-bit ACK, or a 2-bit ACK.

12. The UE of claim 8, wherein the uplink control message is formatted as a short physical uplink control channel message and comprises one or two bits corresponding to the UCI.

13. The UE of claim 8, wherein a number of the ARI bits (X) is defined such that two raised to the number of the ARI bits ($2^X$) is less than a number of resources (Y) configured for the uplink control message ($2^X<Y$).

14. The UE of claim 8, wherein the one or more processors individually or collectively are further operable to execute the code to cause the UE to:
identify that a payload of the uplink control information is one of a one-bit ACK or a two-bit ACK; and
determine the shifted sequence based at least in part on the identified payload.

15. The UE of claim 8, wherein, to determine the shifted sequence of the base sequence, the one or more processors are individually or collectively further operable to execute the code to cause the UE to:
determine a plurality of shifted sequences of the base sequence based at least in part on the UE-specific initial shift and the UCI; and
select the shifted sequence from the plurality of shifted sequences.

16. An apparatus for wireless communication, comprising:
means for identifying a base sequence for transmission of an uplink control message;
means for receiving signaling that indicates a UE-specific initial shift to be used with the base sequence, the signaling comprising:
means for an indication of a subset of resources for the uplink control message included within acknowledgment (ACK) resource indicator (ARI) bits of a downlink control information (DCI) message; and
means for a downlink grant control message having a control channel element (CCE) index;
means for deriving a resource block (RB) index and a shift index for the UE-specific initial shift based at least in part on the CCE index as applied to the subset of resources;
means for determining uplink control information (UCI) for the uplink control message;
means for determining a shifted sequence of the base sequence based at least in part on the UE-specific initial shift and the UCI; and
means for transmitting the UCI in the uplink control message based at least in part on the shifted sequence.

17. The apparatus of claim 16, wherein the downlink grant control message comprises the DCI message.

18. The apparatus of claim 17, wherein the apparatus receives the downlink grant control message on a physical downlink control channel (PDCCH).

19. The apparatus of claim 16, wherein a payload of the uplink control message includes a 1-bit ACK or a 2-bit ACK.

20. The apparatus of claim 16, wherein the uplink control message is formatted as a short physical uplink control channel message and comprises one or two bits corresponding to the UCI.

21. The apparatus of claim 16, wherein a number of the ARI bits (X) is defined such that two raised to the number of the ARI bits ($2^X$) is less than a number of resources (Y) configured for the uplink control message ($2^X<Y$).

22. The apparatus of claim 16, further comprising:
means for identifying that a payload of the uplink control information is one of a one-bit ACK or a two-bit ACK; and
means for determining the shifted sequence based at least in part on the identified payload.

23. The apparatus of claim 16, wherein the means for determining the shifted sequence of the base sequence further comprise:
means for determining a plurality of shifted sequences of the base sequence based at least in part on the UE-specific initial shift and the UCI; and means for selecting the shifted sequence from the plurality of shifted sequences based at least in part on a payload of the UCI.

24. A non-transitory computer-readable medium storing code for wireless communication, the code comprising instructions executable by one or more processors to:

identify a base sequence for transmission of an uplink control message;

receive signaling that indicates a UE-specific initial shift to be used with the base sequence, the signaling comprising:

an indication of a subset of resources for the uplink control message include within acknowledgement (ACK) resource indicator (ARI) bits of a downlink control information (DCI) message; and a downlink grant control message have a control channel element (CCE) index;

derive a resource block (RB) index and a shift index for the UE-specific initial shift based at least in part on the CCE index as applied to the subset of resources;

determine uplink control information (UCI) for the uplink control message;

determine a shifted sequence of the base sequence based at least in part on the UE-specific initial shift and the UCI; and transmit the UCI in the uplink control message based at least in part on the shifted sequence.

25. The non-transitory computer-readable medium of claim 24, wherein the downlink grant control message comprises the DCI message.

26. The non-transitory computer-readable medium of claim 25, wherein the downlink grant control message is received on a physical downlink control channel (PDCCH).

27. The non-transitory computer-readable medium of claim 24, wherein the uplink control message is formatted as a short physical uplink control channel message, and wherein a payload of the uplink control information comprises a one-bit ACK or a two-bit ACK.

* * * * *